(12) United States Patent
Reid

(10) Patent No.: US 10,723,538 B2
(45) Date of Patent: Jul. 28, 2020

(54) VACUUM INSULATED ARTICLES AND METHODS OF MAKING SAME

(71) Applicant: Concept Group, LLC, Wellesley, MA (US)

(72) Inventor: Aarne H Reid, Jupiter, FL (US)

(73) Assignee: Concept Group LLC, Wellesley, MA (US)

( * ) Notice: Subject to any disclaimer, the term of this patent is extended or adjusted under 35 U.S.C. 154(b) by 0 days.

(21) Appl. No.: 15/254,304

(22) Filed: Sep. 1, 2016

(65) Prior Publication Data

US 2017/0043938 A1     Feb. 16, 2017

Related U.S. Application Data

(63) Continuation of application No. 14/627,271, filed on Feb. 20, 2015, now Pat. No. 9,463,918.
(Continued)

(51) Int. Cl.
    *B65D 81/38*     (2006.01)
    *B23K 1/00*     (2006.01)
    (Continued)

(52) U.S. Cl.
    CPC ........ *B65D 81/3818* (2013.01); *B23K 1/0008* (2013.01); *B23K 31/02* (2013.01);
    (Continued)

(58) Field of Classification Search
    CPC . Y10T 428/23; Y10T 428/231; Y10T 428/13; Y10T 428/12493; Y10T 428/125; Y10T 428/12507; Y10T 428/12514; Y10T 428/12521; Y10T 428/12632; Y10T 428/12639; Y10T 428/12646; Y10T 428/12653; Y10T 428/12736;
    (Continued)

(56) References Cited

U.S. PATENT DOCUMENTS 1,362,805 A    12/1920   Kruse
1,457,504 A     6/1923   Cullen et al.
(Continued)

FOREIGN PATENT DOCUMENTS

CN     202001825 U    10/2011
DE     10019420 A1    10/2001
(Continued)

OTHER PUBLICATIONS

U.S. Appl. No. 12/766,397, filed Apr. 23, 2010, ConceptGroup Inc.
(Continued)

*Primary Examiner* — Maria V Ewald
*Assistant Examiner* — Ethan A. Utt
(74) *Attorney, Agent, or Firm* — BakerHostetler

(57) ABSTRACT

The present disclosure provides vacuum insulated articles having two—or more—insulated volumes at reduced pressure. An article may include a first vent communicating with a first insulating space, a second vent communicating with a second insulating space, a first circular insulation seal sealing the first insulating space at the first vent; and a second circular insulation seal sealing the second insulating space at the second vent. Also provided are methods of fabricating vacuum insulated articles.

18 Claims, 13 Drawing Sheets

Related U.S. Application Data

(60) Provisional application No. 61/942,323, filed on Feb. 20, 2014.

(51) Int. Cl.
*B23K 31/02* (2006.01)
*B23K 101/04* (2006.01)

(52) U.S. Cl.
CPC ...... *B65D 81/3841* (2013.01); *B23K 2101/04* (2018.08); *Y10T 428/231* (2015.01)

(58) Field of Classification Search
CPC ....... Y10T 428/12743; Y10T 428/1275; Y10T 428/12757; Y10T 428/12764; Y10T 428/12771; Y10T 428/12778; Y10T 428/12785; Y10T 428/12792; Y10T 428/12799; Y10T 428/12806; Y10T 428/12812; Y10T 428/12819; Y10T 428/12826; Y10T 428/12833; Y10T 428/1284; Y10T 428/12847; Y10T 428/12854; Y10T 428/12861; Y10T 428/12868; Y10T 428/12875; Y10T 428/12882; Y10T 428/12889; Y10T 428/12896; Y10T 428/12903; Y10T 428/1291; Y10T 428/12917; Y10T 428/12924; Y10T 428/12931; Y10T 428/12937; Y10T 428/12944; Y10T 428/12951; Y10T 428/12958; Y10T 428/12965; Y10T 428/12972; Y10T 428/12979; Y10T 29/49826; Y10T 29/49879; Y10T 29/49908; Y10T 29/49909; Y10T 29/49911; Y10T 29/49915; Y10T 29/49917; Y10T 29/49918; Y10T 29/4992; B32B 1/00; B32B 1/02; B32B 1/08; B32B 15/00; B32B 15/01; B32B 15/011; B32B 15/012; B32B 15/013; B32B 15/015; B32B 15/016; B32B 15/017; B32B 15/018; B32B 15/04; B32B 15/043; B32B 15/18; B32B 15/20; E06B 3/66; E06B 3/6612; E06B 3/663; E06B 3/66304; E06B 3/66309; E06B 3/66314; E06B 3/66319; E06B 3/66323; E06B 3/66328; E06B 3/66333; E06B 3/66366; E06B 2003/66338; E06B 2003/66385; F17C 1/00; F17C 1/12; F17C 1/14; F17C 3/00; F17C 3/02; F17C 3/08; F17C 3/085; F17C 2201/0104; F17C 2201/0109; F17C 2201/0114; F17C 2201/0119; F17C 2201/0123; F17C 2203/0391; F17C 2203/0395; F17C 2203/0631; F17C 2270/0509; A47J 41/00; A47J 41/02; A47J 41/022; A47J 41/024; A47J 41/026; A47J 41/028; B65D 81/00; B65D 81/38; B65D 81/18; B65D 81/20; B65D 81/2007; B65D 81/2015; B65D 81/2023; B65D 81/203; B65D 81/2038; F16L 59/00; F16L 59/06; F16L 59/065; F16L 59/075; B23K 2101/04; B23K 2101/06; B23K 2101/12; B23K 2101/125
USPC .... 428/68, 69, 34, 34.1, 615–619, 635–638, 428/650–685; 29/428, 455, 455.1, 29/505–512; 220/560.04–560.15, 220/592.01–592.28, 506, 918, 921, 220/62.11–62.22, 745, 366.1, 592.2, 220/592.21, 592.26, 529.27; 606/20–26; 215/12.1, 12.2; 206/829
See application file for complete search history.

(56) References Cited

U.S. PATENT DOCUMENTS

| | | |
|---|---|---|
| 2,085,737 A | 7/1937 | Cereghino |
| 2,225,660 A | 12/1940 | Rogers |
| 2,362,893 A | 11/1944 | Durst |
| 2,363,893 A | 11/1944 | Baptiste |
| 2,573,594 A | 10/1951 | Nofzinger |
| 2,666,979 A | 1/1954 | Van Dusen |
| 2,722,336 A | 11/1955 | Aaron et al. |
| 2,807,074 A | 9/1957 | Schroeder |
| 2,867,242 A | 1/1959 | Harris et al. |
| 3,119,238 A | 1/1964 | Chamberlain et al. |
| 3,146,005 A | 8/1964 | Peyton |
| 3,195,564 A | 7/1965 | Carney et al. |
| 3,265,236 A | 8/1966 | Gibbon et al. |
| 3,460,512 A | 8/1969 | Keichler et al. |
| 3,510,323 A | 5/1970 | Wismer et al. |
| 3,706,208 A | 12/1972 | Kadi et al. |
| 3,760,142 A | 9/1973 | Schoenthaler |
| 4,055,268 A | 10/1977 | Barthel |
| 4,117,201 A | 9/1978 | Keifert |
| 4,157,779 A | 6/1979 | Arashi et al. |
| 4,200,199 A | 4/1980 | Perkins et al. |
| 4,332,401 A | 6/1982 | Stephenson et al. |
| 4,396,211 A | 8/1983 | McStravick et al. |
| 4,399,919 A | 8/1983 | Posnansky et al. |
| 4,450,872 A | 5/1984 | Orcutt |
| 4,491,347 A | 1/1985 | Gustafson |
| 4,515,397 A | 5/1985 | Nowobilski et al. |
| 4,653,469 A | 3/1987 | Miyaji et al. |
| 4,696,104 A | 9/1987 | Vanzetti et al. |
| 4,746,054 A | 5/1988 | Moats et al. |
| 4,903,631 A | 2/1990 | Morris |
| 4,919,299 A * | 4/1990 | Haines ............... B65D 11/16 220/495.08 |
| 4,997,124 A | 3/1991 | Kitabatake et al. |
| 5,038,706 A | 8/1991 | Morris |
| 5,052,816 A | 10/1991 | Nakamura et al. |
| 5,108,390 A | 4/1992 | Potocky et al. |
| 5,206,705 A | 4/1993 | Tokura |
| 5,235,817 A | 8/1993 | Gallagher et al. |
| 5,411,897 A | 5/1995 | Harvey et al. |
| 5,520,682 A | 5/1996 | Baust et al. |
| 5,524,630 A | 6/1996 | Crowley |
| 5,573,140 A | 11/1996 | Satomi et al. |
| 5,600,752 A | 2/1997 | Lopatinsky |
| 5,650,020 A | 7/1997 | Ohta et al. |
| 5,674,218 A | 10/1997 | Rubinsky et al. |
| 5,742,048 A | 4/1998 | Kobayashi et al. |
| 5,862,973 A | 1/1999 | Wasserman |
| 5,869,801 A | 2/1999 | Paton et al. |
| 5,870,823 A | 2/1999 | Bezama et al. |
| 6,095,405 A | 8/2000 | Kim et al. |
| 6,145,547 A | 11/2000 | Villatte |
| 6,166,907 A | 12/2000 | Chien |
| 6,186,390 B1 | 2/2001 | Tadauchi et al. |
| 6,216,745 B1 | 4/2001 | Augustynowicz et al. |
| 6,360,935 B1 | 3/2002 | Flake |
| 6,706,037 B2 | 3/2004 | Zvuloni et al. |
| 6,875,209 B2 | 4/2005 | Zvuloni et al. |
| 6,936,045 B2 | 8/2005 | Yu et al. |
| 7,064,429 B2 | 6/2006 | Bemmerl et al. |
| 7,139,172 B2 | 11/2006 | Bezama et al. |
| 7,150,743 B2 | 12/2006 | Zvuloni et al. |
| 7,203,064 B2 | 4/2007 | Mongia et al. |
| 7,207,985 B2 | 4/2007 | Duong et al. |
| 7,258,161 B2 | 8/2007 | Cosley et al. |
| 7,298,623 B1 | 11/2007 | Kuczynski et al. |
| RE40,049 E | 2/2008 | Li |
| 7,334,630 B2 | 2/2008 | Goodson et al. |
| 7,354,434 B2 | 4/2008 | Zvuloni et al. |
| 7,356,434 B2 | 4/2008 | Wu et al. |
| 7,361,187 B2 | 4/2008 | Duong et al. |

(56) References Cited

U.S. PATENT DOCUMENTS

| | | |
|---|---|---|
| 7,374,063 B2 | 5/2008 | Reid |
| 7,393,350 B2 | 7/2008 | Maurice |
| 7,419,085 B2 | 9/2008 | Fukunaka et al. |
| 7,451,785 B2 | 11/2008 | Taira et al. |
| 7,460,369 B1 | 12/2008 | Blish, II |
| 7,485,117 B2 | 2/2009 | Damasco et al. |
| 7,497,365 B2 | 3/2009 | Kimura et al. |
| 7,510,534 B2 | 3/2009 | Burdorff et al. |
| 7,515,415 B2 | 4/2009 | Monfarad et al. |
| 7,608,071 B2 | 10/2009 | Duong et al. |
| 7,621,889 B2 | 11/2009 | Duong et al. |
| 7,621,890 B2 | 11/2009 | Duong et al. |
| 7,681,299 B2 | 3/2010 | Reid |
| 7,909,227 B2 | 3/2011 | Duong et al. |
| 7,980,171 B2 | 7/2011 | Groll |
| 8,353,332 B2 | 1/2013 | Reid |
| 8,434,665 B2 | 5/2013 | Motomura et al. |
| 9,243,726 B2 | 1/2016 | Reid |
| 9,463,918 B2 * | 10/2016 | Reid ............. B65D 81/3818 |
| 9,874,303 B2 | 1/2018 | Reid |
| 2001/0030225 A1 | 10/2001 | Nagata |
| 2002/0114937 A1 | 8/2002 | Albert et al. |
| 2003/0079554 A1 | 5/2003 | Van Cleve |
| 2003/0146224 A1 | 8/2003 | Fujii et al. |
| 2004/0129756 A1 | 7/2004 | Zakel et al. |
| 2004/0226979 A1 | 11/2004 | Sato et al. |
| 2005/0211711 A1 | 9/2005 | Reid |
| 2006/0054234 A1 | 3/2006 | White |
| 2006/0054243 A1 | 3/2006 | Walton |
| 2006/0061092 A1 | 3/2006 | Keyes |
| 2006/0071052 A1 | 4/2006 | Conlon et al. |
| 2006/0076389 A1 | 4/2006 | Kemper et al. |
| 2006/0086773 A1 | 4/2006 | Sanftleben et al. |
| 2006/0282039 A1 | 12/2006 | Duong et al. |
| 2007/0102477 A1 | 5/2007 | Prince |
| 2007/0102478 A1 | 5/2007 | Prince |
| 2007/0235497 A1 | 10/2007 | Hsu |
| 2007/0235498 A1 | 10/2007 | Hsu |
| 2007/0235499 A1 | 10/2007 | Hsu |
| 2007/0246510 A1 | 10/2007 | Hsu |
| 2008/0006598 A1 | 1/2008 | Fujii et al. |
| 2008/0036076 A1 | 2/2008 | Ouyang |
| 2008/0061111 A1 | 3/2008 | Kiriyama |
| 2008/0083816 A1 | 4/2008 | Leinbach et al. |
| 2008/0121642 A1 | 5/2008 | Reid |
| 2008/0169037 A1 | 7/2008 | Ziegler |
| 2008/0197170 A1 | 8/2008 | Prince |
| 2008/0285230 A1 | 11/2008 | Bojan et al. |
| 2009/0031659 A1 | 2/2009 | Kalfon |
| 2009/0065499 A1 | 3/2009 | England |
| 2009/0068070 A1 | 3/2009 | Hashimoto et al. |
| 2009/0123221 A1 | 5/2009 | Marshall |
| 2009/0152331 A1 | 6/2009 | Schmitt et al. |
| 2010/0057064 A1 | 3/2010 | Baust et al. |
| 2010/0057067 A1 | 3/2010 | Baust et al. |
| 2010/0076421 A1 | 3/2010 | Baust et al. |
| 2010/0096037 A1 | 4/2010 | Lee et al. |
| 2010/0258290 A1 | 10/2010 | Bass |
| 2011/0056582 A1 | 3/2011 | Walle et al. |
| 2011/0264084 A1 | 10/2011 | Reid |
| 2012/0085070 A1 | 4/2012 | Chou et al. |
| 2012/0090817 A1 | 4/2012 | Reid |
| 2012/0175007 A1 | 7/2012 | Pan et al. |
| 2012/0228364 A1 | 9/2012 | Vegelahn |
| 2012/0282792 A1 | 11/2012 | Schloegl |
| 2012/0318808 A1 | 12/2012 | McCormick |
| 2013/0105496 A1 | 5/2013 | Jung |
| 2014/0008417 A1 | 1/2014 | Visser et al. |
| 2014/0090737 A1 | 4/2014 | Reid |
| 2014/0182608 A1 | 7/2014 | Egoyants et al. |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2016/0044963 A1 | 2/2016 | Saleem |
| 2016/0084425 A1 | 3/2016 | Reid |
| 2016/0279725 A1 | 9/2016 | Azdasht |
| 2016/0354853 A1 | 12/2016 | Azdasht |
| 2016/0368072 A1 | 12/2016 | Senga et al. |
| 2017/0043938 A1 | 2/2017 | Reid |
| 2017/0062774 A1 | 3/2017 | Reid |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |

FOREIGN PATENT DOCUMENTS

| | | | |
|---|---|---|---|
| EP | 0611614 A1 | 8/1994 | |
| EP | 1294022 A2 | 3/2003 | |
| FR | 2550313 A1 | 2/1985 | |
| GB | 2105226 A | 3/1983 | |
| JP | 06-142909 A | 5/1994 | |
| JP | 3654249 B2 | 6/2005 | |
| JP | 2005-224832 A | 8/2005 | |
| JP | 3962782 B1 | 8/2007 | |
| JP | 2008-045956 A | 2/2008 | |
| WO | 03/25476 A2 | 3/2003 | |
| WO | WO-2013034455 A1 * | 3/2013 | ............ F16L 59/065 |
| WO | 2018/093776 A1 | 5/2018 | |
| WO | 2019/040885 A1 | 2/2019 | |

OTHER PUBLICATIONS

Overview of NAS Battery for Load Management; CEC Energy Storage Workshop, Feb. 2005, pp. 1-22.
National Research Council, "Assessment of Research Needs for Advanced Battery Systems", 1982, 203 pages.
https://en.wikipedia.org/wiki/Sodium-sulfur_battery_June 11, 2018, 5 pages.
Hodkinson et al., "Lightweight Electric/Hybrid Vehicle Design", 2001, 4 pages.
Guidotti et al., "Characterization of Vacuum-Multifoil Insulation for Long-Life Thermal Batteries", U.S. Department of Energy, Office of Scientific and Technical Information, Apr. 17, 2000, 3 pages.
Daniel et al., "Handbook of Battery Materials", Wiley-VCH Publishers, 2011, vol. 1, 3 pages.
https://en.wikipedia.org/wiki/Sodium-sulfur battery Jun. 11, 2018, 5 pages.
Database WPI Week 201179 Thomson Scientific, London, GB; AN 2011-N98729 XP002794699, & CN 202 001 825U (LINS) Oct. 5, 2011 (Oct. 5, 2011).

* cited by examiner

VACUUM INSULATED ARTICLES AND METHODS OF MAKING SAME

RELATED APPLICATION

The present application is a continuation of now-allowed U.S. patent application Ser. No. 14/627,271, "Vacuum Insulated Articles and Methods of Making Same," filed Feb. 20, 2015, which application claims priority to U.S. Provisional Patent Application 61/942,323, "Vacuum Insulated Articles and Methods of Making Same," filed Feb. 20, 2014 Both of these applications are incorporated herein by reference in their entireties for any and all purposes.

TECHNICAL FIELD

The present disclosure relates to the field of vacuum-sealed articles.

BACKGROUND

Although useful, vacuum insulated structures may have some limitations when used in applications where mechanical impacts can lead to breakage of vacuum seals or the jacket walls, and thereby the vacuum insulation is lost. Moreover, to increase the insulation capabilities of the vacuum insulated structure, usually the vacuum chamber has to be increased in size, and many applications do not allow for such increase of the structure's volume. Accordingly, in light of these deficiencies of the background art, new and improved vacuum insulated containers are desired. Methods for fabricating such improved structures are also needed.

SUMMARY

In one aspect, the present disclosure provides vacuum insulated articles. An vacuum insulated article may include an outer wall, an inner wall, and a middle wall (the middle wall being disposed between the inner and outer walls), each of the outer wall, the inner wall, and the middle wall having a cylindrical shape that are concentric or nearly concentric to each other; a first insulating space formed between the outer wall and the middle wall; and a second insulating space formed between the middle wall and the inner wall. A vacuum insulated article may also include a first vent communicating with the first insulating space to provide an exit pathway for gas molecules from the first insulating space, the first vent being sealable for maintaining a first vacuum within the first insulating space following evacuation of gas molecules through the first vent, a second vent communicating with the second insulating space to provide an exit pathway for gas molecules from the second insulating space, the second vent being sealable for maintaining a second vacuum within the second insulating space following evacuation of gas molecules through the second vent, a first circular insulation seal sealing the first insulating space at the first vent; and a second circular insulation seal sealing the second insulating space at the second vent.

In another aspect of the present disclosure, other vacuum insulated articles are provided. A vacuum insulated article preferably includes an outer wall, an inner wall, and a middle wall, each of the outer wall, the inner wall, and the middle wall having a cylindrical shape that are concentric to each other, an area between the inner wall and the middle wall forming a first insulating space, and an area between the middle wall and the outer wall forming a second insulating space, a first circular ring arranged between the inner wall and the middle wall, the first circular ring having a first beveled edge circularly arranged around the first circular ring facing at least one of the inner wall and the middle wall, a first vent formed at the first beveled edge communicating with the first insulating space, and a second circular ring arranged between the middle wall and the outer wall, the second circular ring having a second beveled edge circularly arranged around the second circular ring facing at least one of the inner wall and the middle wall, a second vent formed at the second beveled edge communicating with the second insulating space. The vacuum insulated article may further includes a first circular insulation seal sealing the first insulating space at the first vent, and a second circular insulation seal sealing the second insulating space at the second vent.

In another aspect, the present disclosure provides methods of forming vacuum insulated articles. These methods suitably include the steps of forming or providing a first tube having a first diameter defined by an outer wall, forming or providing a second tube having a second diameter defined by a middle wall, the second diameter being smaller than the first diameter, forming or providing a third tube having a third diameter defined by an inner wall, the third diameter being smaller than the second diameter, positioning the third tube into the second tube to form a first annular insulating space between the third tube and the second tube, such that ends of the second tube and the third tube are positioned so as to form a first circular vent between the end of the second tube and the end of the third tube. The methods also suitably include drawing a vacuum on the first annular insulating space by causing air to escape through the first circular vent, and sealing the first circular vent to preserve the vacuum within the first annular insulating space. The methods may further include the steps of positioning the second tube into the first tube to form a second annular insulating space between the second tube and the first tube, such that ends of the first tube and the second tube are positioned so as to form a second circular vent between the end of the first tube and the end of the second tube; drawing a vacuum on the second annular insulating space by causing air to escape through the second circular vent; and sealing the second circular vent to preserve the vacuum within the second annular insulating space.

The present disclosure also provides vacuum insulated articles, the articles suitably comprising: an outer wall, an inner wall, and a middle wall, at least one of the outer wall, inner wall, or middle wall having a planar region, an area between the inner wall and the middle wall defining a first sealed insulating space, and an area between the middle wall and the outer wall defining a second sealed insulating space; and at least one of the first sealed insulating space and second sealed insulating space being at less than ambient pressure. By less than ambient pressure is meant that the pressure is suitably less than 760 Torr. Pressures of about $10^{-1}$, $10^{-2}$, $10^{-3}$, $10^{-4}$, $10^{-5}$, $10^{-6}$, and even about $10^{-7}$ Torr are all considered suitable.

This disclosure also provides methods, the methods suitably including arranging first and second surfaces at a distance from one another so as to define an overlap volume between the surfaces that has at least one opening placing the overlap region into fluid communication with the environment exterior to the overlap volume, at least one of the first and second surfaces having a first region having a curvature; effecting a vacuum on the overlap volume by causing air to escape the overlap volume; sealing the overlap volume so as to preserve the vacuum within the overlap volume, the method being performed such that the curvature of the first region is changed.

Additionally provided are methods of forming a vacuum insulated article, comprising forming a vacuum in a first space defined between an outer wall and a middle wall, at least one of the outer and middle walls having a planar region that overlaps the first space; forming a vacuum in a second space defined between the middle wall and an inner wall, at least one of the middle and inner walls having a planar region that overlaps the second space; sealing the first space so as to maintain the vacuum in the first space; sealing the second space so as to maintain the vacuum in the second space.

The disclosure also provides methods of forming a vacuum insulated article, comprising with (a) a first tube having a first diameter defined by an outer wall, (b) a second tube having a second diameter defined by a middle wall, the second diameter being smaller than the first diameter, and (c) a third tube having a third diameter defined by an inner wall, the third diameter being smaller than the second diameter, positioning the third tube into the second tube to form a first annular insulating space between the third tube and the second tube, such that ends of the second tube and the third tube are positioned adjacent to each other to form a first circular vent between the end of the second tube and the end of the third tube; drawing a vacuum on the first annular insulating space by causing air to escape through the first circular vent; sealing the first circular vent to preserve the vacuum within the first annular insulating space; positioning the second tube into the first tube to form a second annular insulating space between the second tube and the first tube, such that ends of the first tube and the second tube are positioned adjacent to each other to form a second circular vent between the end of the first tube and the end of the second tube; drawing a vacuum on the second annular insulating space by causing air to escape through the second circular vent; and sealing the second circular vent to preserve the vacuum within the second annular insulating space.

The disclosure also provides vacuum insulated articles, comprising an outer wall, an inner wall, and a middle wall, each of the outer wall, the inner wall, and the middle wall having a cylindrical shape, an area between the inner wall and the middle wall forming a first insulating space, and an area between the middle wall and the outer wall forming a second insulating space; a first vent communicating with the first insulating space; a second vent communicating with the second insulating space; a first seal sealing the first insulating space at the first vent; and a second seal sealing the second insulating space at the second vent.

The foregoing summary is neither intended nor should it be construed as being representative of the full extent and the scope of the invention, which additional aspects will become more readily apparent from the detailed description, particularly when taken together with the appended drawings.

BRIEF DESCRIPTION OF THE DRAWINGS

The summary, as well as the following detailed description, is further understood when read in conjunction with the appended drawings. For the purpose of illustrating the invention, there are shown in the drawings exemplary and preferred embodiments of the invention; however, the disclosure is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Any documents mentioned herein are incorporated herein in their entireties for any and all purposes.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When referring to a value, the term "about" means the value and all other values within 10% of the value. For example, "about 10" means from 9 to 11 and all intermediate values, including 10.

Vacuum insulated structures have many practical uses and can be constructed as described, for example, in U.S. Pat.

Nos. 7,681,299 and 7,374,063 and in U.S. patent application Ser. No. 12/766,397 (all incorporated herein by reference in their entireties for any and all purposes), in which tube walls and jacket walls are vacuum brazed together so that a vacuum chamber is formed between the tube and jacket walls.

Figure 1A:
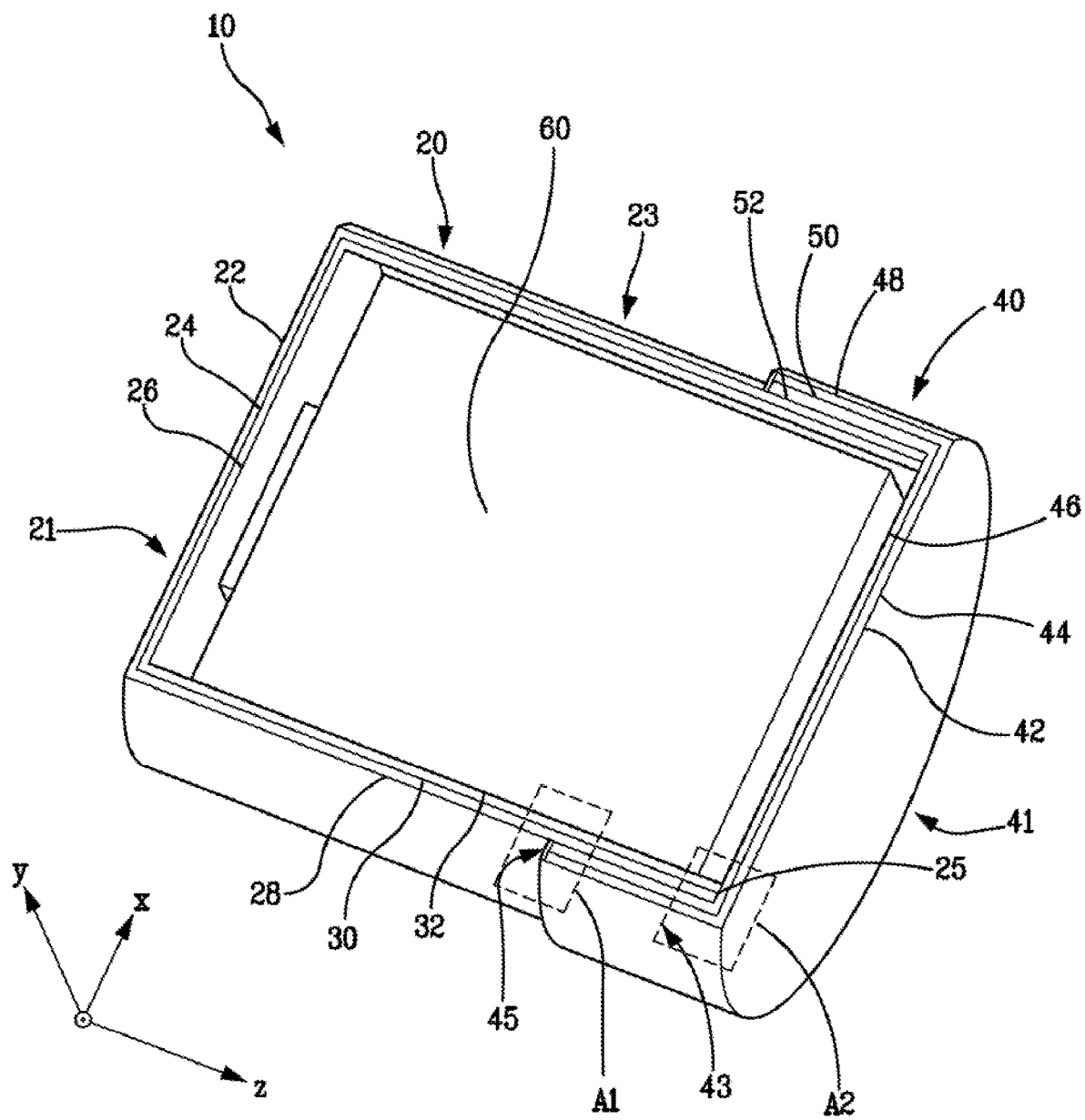
FIG. 1A shows a cross-sectional perspective view of the vacuum insulated structure, and FIGS. 1B-1C showing close-up views of areas A1 and A2 of FIG. 1A, respectively, according to an embodiment of the present invention.
Figure 1B:
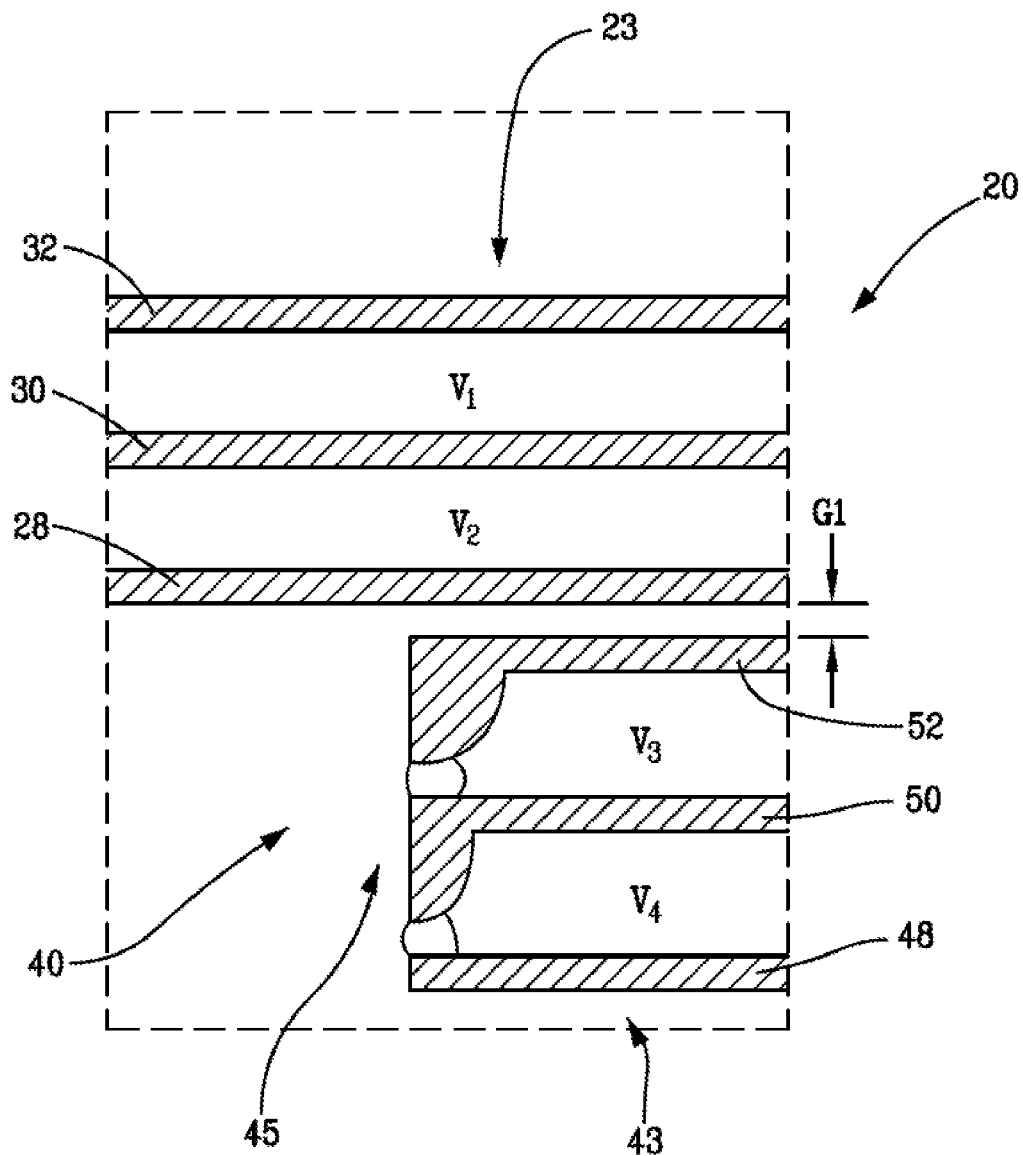
Figure 1C:
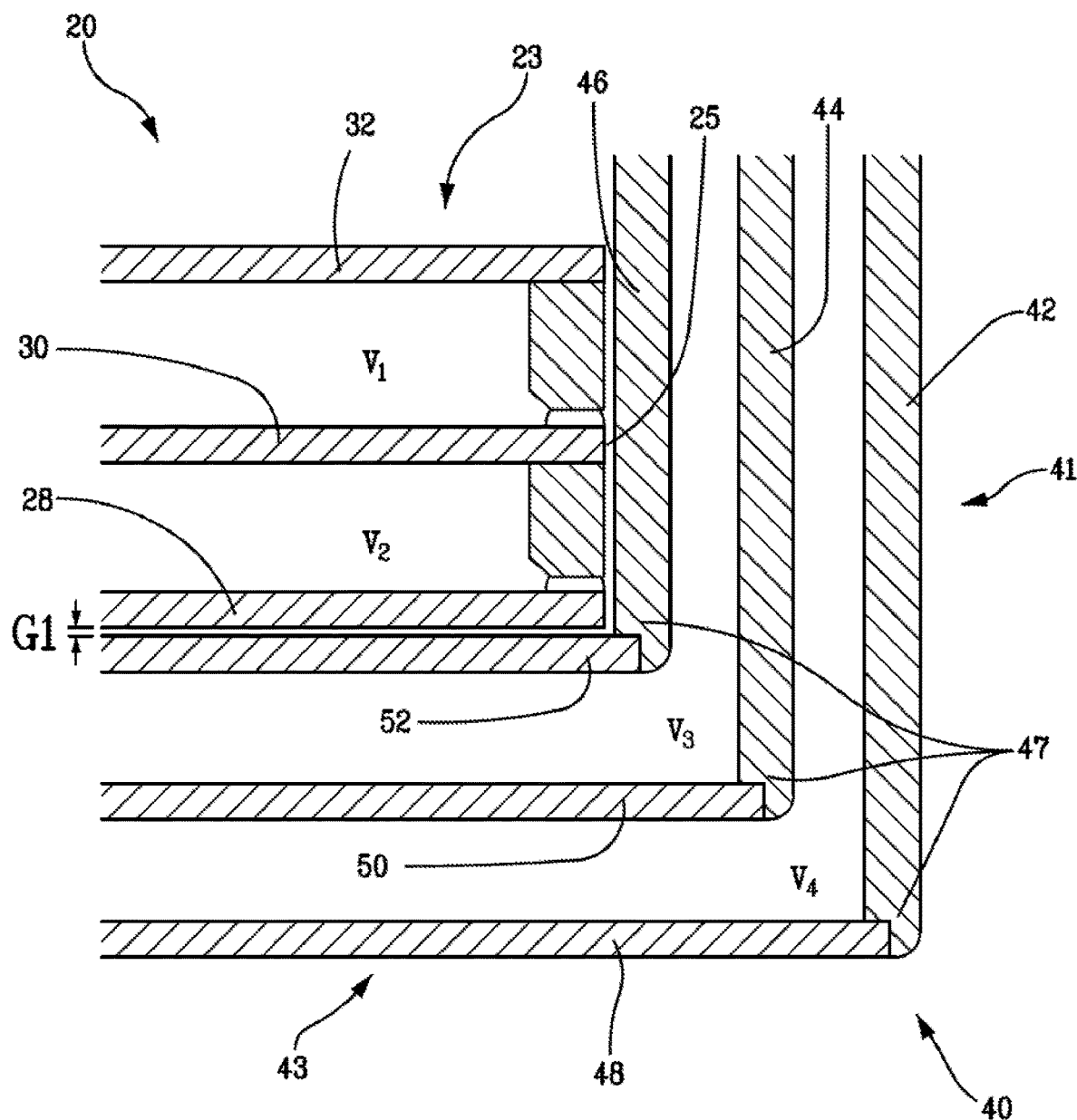

A first embodiment of the present invention is described with respect to FIG. 1A-1C, with FIG. 1A showing a cross-sectional perspective view of a vacuum insulated structure 10 made of an inner cylindrical casing 20 having a bottom portion 21 and being open at a side that is opposite to bottom portion 21, and an outer cylindrical casing 40 having a lid portion 41 and being open at a side that is opposite to lid portion 41, FIG. 1B showing a close-up cross-sectional view of the area A1 shown in FIG. 1A, including peripheral edge 45 of outer cylindrical casing 40 and peripheral edge 25 of inner casing 20, and FIG. 1C showing a close-up cross-sectional view of the area A2 shown in FIG. 1A. For descriptive purposes, the description below makes references to an x, y, and z Cartesian coordinate system that is depicted in FIGS. 1A to 1C, in which the x-direction is defined as one direction of a plane that is parallel to walls 22, 24, 26, 42, 44, 46, the y-direction is defined as another direction perpendicular to the x-direction in the same plane, and the z-direction is a direction that is parallel to a central axis that defines the cylinder of casings 10, 20. In this respect, the negative z-direction is referred to as a bottom side or left side, and the positive z-direction is defined as the top, upper or right side.

As shown in FIGS. 1A and 1C, an outer diameter of inner cylindrical casing 20 and an inner diameter of the outer cylindrical casing 40 made such that the outer cylindrical casing 40 can be slid or screwed over the inner casing 20, with gap G1 remaining between, as shown in detail in FIG. 1B. In the embodiment shown, inner cylindrical casing 20 can be composed of a circular or oval shaped bottom portion 21, and cylindrical sidewalls 23, and outer cylindrical casing 40 can be made of circular or oval shaped lid portion 41 and cylindrical sidewalls 43 that are shorter in length than the sidewalls 23 of the inner cylindrical casing 20. It is also possible that lid portion 41 and bottom portion 21 have different shapes, other than oval or round, as long as they are matching to allow casings 20 and 40 to be fitted into each other, forming gap G1 therebetween. The cylindrical side walls 23 are formed of an inner wall 32, an middle wall 30, and an outer wall 28, and bottom portion 21 is formed of inner wall 26, middle wall 24, and outer wall 22, and a vacuum space V1 is formed between inner walls 32, 26 and middle walls 30, 24, and a vacuum space V2 is formed between middle walls 30, 24 and outer walls 28, 22. Inner walls 32, 26, middle walls 30, 24, and outer walls 28, 22, respectively, form structures can have a shape of an open cylinder with increasingly larger diameter, so that they are interposed in each other, as shown in FIG. 1A. Upper edge 25 of inner cylindrical casing 20 is closed to form a vacuum seal. Upper edge 25 of inner cylindrical casing 20 is close or abuts against inner wall 46 of outer cylindrical casing 40.

Analogously to the inner cylindrical casing 20, outer cylindrical casing 40 can be composed of cylindrical side walls 43 that are formed of an inner wall 52, an middle wall 50, and an outer wall 48, and lid portion 41 is formed of inner wall 46, middle wall 44, and outer wall 42, and a vacuum space V3 is formed between inner walls 52, 46 and middle walls 50, 44, and a vacuum space V4 is formed between middle walls 50, 54 and outer walls 48, 42. Inner walls 52, 46, middle walls 50, 44, and outer walls 48, 42, respectively, form structures that can have a shape of an open cylinder with increasingly larger diameter, so that they are interposed in each other, as shown in FIG. 1A The walls can be formed of a single layer of sheet metal, e.g., stainless steel, copper, aluminum, and the like. It should be understood that walls between which a vacuum is formed may have the same thickness, but this is not a requirement. For example, a vacuum may be formed between a first wall having thickness T1 and a second wall having thickness T2, where T1 is not equal to T2. Walls between which a vacuum is formed may have a thickness ratio (relative to one another) of about 100:1 to about 1:100, or from about 10:1 to about 1:10. It should also be understood that walls may be—but need not be—cylindrical in conformation.

The upper edge 45 of inner cylindrical casing 40 may be closed to form a vacuum seal, as shown in FIG. 1B. Gap G1 between inner and outer cylindrical casings 40, 20 can be filled with an adhesive, e.g., example Accolite™, or can be soldered together to form an insulated inner area 60 of vacuum insulated structure 10. A gap width (e.g., gap G1) may be, for example, in the range of from about 0.001 mm to about 10 mm, from about 0.01 mm to about 1 mm, or from about 0.1 mm or about 0.5 mm. Gaps of 0.1 mm are considered especially suitable.

The surfaces of inner and outer cylindrical casings 40, 20 that face each other may be matchingly threaded so that outer casing 20 can be screwed onto inner casing 40. Also, as shown in FIG. 1C, cylindrical outer wall 48 is connected to an oval or circularly shaped outer wall 42 so that outer wall 48 fits into a recessed edge 47 around the entire circumference of outer wall 42, and are connected to each other by soldering or brazing, and in the same fashion walls 50, 52 can be connected to walls 44, 46 respectively. In the same fashion, walls 22, 24, 26 can be oval or circularly shaped disks with recessed edges to accommodate walls 28, 30, 32, respectively.

Figure 2:
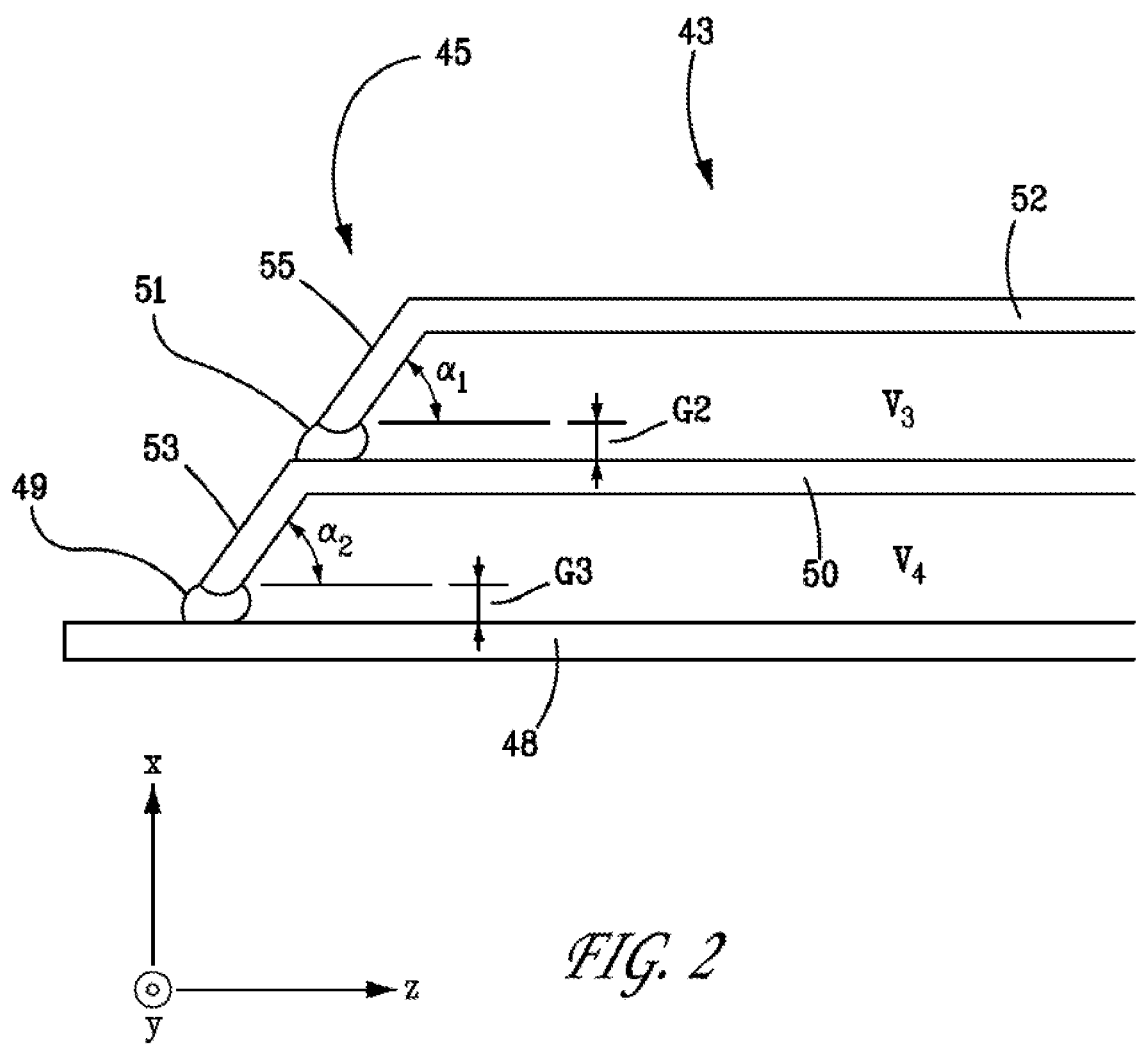
FIG. 2 shows a cross-sectional view of a peripheral edge of a casing of the vacuum insulated structure, according to an embodiment of the present invention.

FIG. 2 shows a close up cross-sectional view of upper edge 45 of inner cylindrical casing, according to another embodiment of the present invention. A peripheral edge of inner wall 52 is bent inwardly around the entire circumference of wall 43 to form an angled edge 55 having an angle α1 relative to a horizontal expansion of the side walls 48, 50, 52. Joint or seal 51 is arranged at a tip of angles edge 55 and outer surface of middle wall 50 to form a vacuum seal for vacuum space V3 circumferentially around the entire upper edge 45. Analogously, a peripheral edge of middle wall 50 is bent inwardly around the entire circumference of wall 43 to form an angled edge 53 having an angle α2 relative to a vertical expansion of the side walls 48, 50, 52. Joint or seal 49 is arranged at a tip of angled edge 53 and outer surface of outer wall 48 to form a vacuum seal for vacuum space V4 circumferentially around the entire upper edge 45. Moreover, angled edge 55 of inner wall 52 and angled edge 53 of middle wall 50 are bent such that gaps G2, G3, respectively, is remaining between inner wall 52 and middle wall 50, and between middle wall 50 and outer wall 48, respectively, the gaps G2, G3, having exemplary widths of about 0.001 mm to about 5 mm, or from about 0.01 mm to about 1 mm, or from about 0.1 mm to about 0.5 mm, is circumferentially arranged around the respective walls. It is noted that upper edge 25 of outer cylindrical casing can have an analogous structure, with walls 32, 30, 28, instead of walls 52, 50, 48, respectively. It should be further understood that a wall may include an extended portion (e.g., a ridge) portion that extends from the wall. Such an extended portion may serve to maintain spacing between that wall and an adjacent wall.

The extended portion may be used in place of—or be used with—a spacer ring; spacer rings are described in additional detail elsewhere herein.

As explained in U.S. Pat. Nos. 7,681,299 and 7,374,063, the geometry of the insulating space may be such that it guides gas molecules within the space toward a vent or other exit from the space. The width of the vacuum insulating space need not be not uniform throughout the length of the space. The space may include an angled portion such that one surface that defines the space converges toward another surface that defines the space. As a result, the distance separating the surfaces may vary adjacent the vent such the distance is at a minimum adjacent the location at which the vent communicates with the vacuum space. The interaction between gas molecules and the variable-distance portion during conditions of low molecule concentration serves to direct the gas molecules toward the vent.

The molecule-guiding geometry of the space provides for a deeper vacuum to be sealed within the space than that which is imposed on the exterior of the structure to evacuate the space. This somewhat counterintuitive result of deeper vacuum within the space is achieved because the geometry of the present invention significantly increases the probability that a gas molecule will leave the space rather than enter. In effect, the geometry of the insulating space functions like a check valve to facilitate free passage of gas molecules in one direction (via the exit pathway defined by vent) while blocking passage in the opposite direction.

Another benefit associated with the deeper vacuums provided by the geometry of insulating space is that it is achievable without the need for a getter material within the evacuated space. The ability to develop such deep vacuums without a getter material provides for deeper vacuums in devices of miniature scale and devices having insulating spaces of narrow width where space constraints would limit the use of a getter material.

Although not required, a getter material may be used in an evacuated space having gas molecule guiding structure according to the invention. Other vacuum-enhancing features could also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

In some embodiments, an article may comprise first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

The convergence of the space provides guidance of molecules in the following manner. When the gas molecule concentration becomes sufficiently low during evacuation of the space such that structure geometry becomes a first order effect, the converging walls of the variable distance portion of the space channel gas molecules in the space toward the vent. The geometry of the converging wall portion of the vacuum space functions like a check valve or diode because the probability that a gas molecule will leave the space, rather than enter, is greatly increased.

The effect that the molecule-guiding geometry of structure has on the relative probabilities of molecule egress versus entry may be understood by analogizing the converging-wall portion of the vacuum space to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are provided herein. It should be understood that the gas guiding geometry of the invention is not limited to a converging-wall funneling construction and may, instead, utilize other forms of gas molecule guiding geometries.

Figure 3:
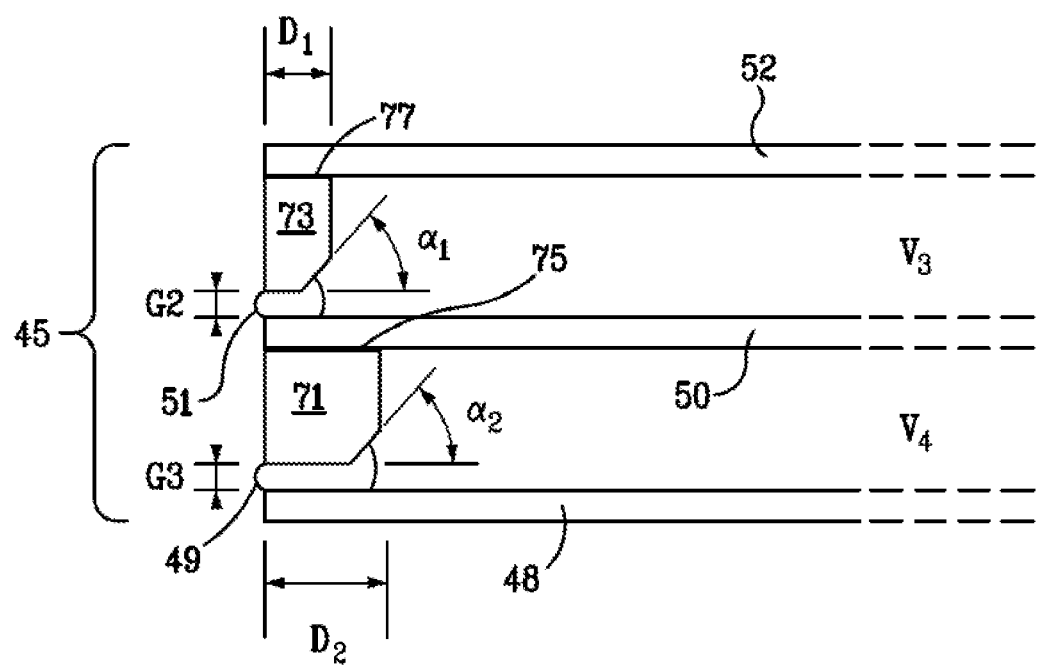
FIG. 3 shows a cross-sectional view of a peripheral edge of a casing of the vacuum insulated structure, according to another embodiment of the present invention.
Figure 3:
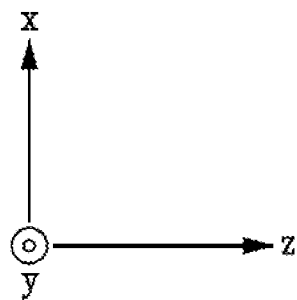

FIG. 3 shows a close up cross-sectional view of upper edge 45 of inner cylindrical casing 40, according to another embodiment of the present invention. In this embodiment, upper edge 45 is formed to have an outer surface that is perpendicular to a horizontal expansion of the side walls 48, 50, 52. Instead of having bent portions of side walls 48, 50, 52, spacer rings 73 and 71 are arranged to fit at peripheral ends between middle wall 50 and inner wall 52, and outer wall 48 and middle wall 50, respectively. Spacer ring 73 is brazed or soldered to corresponding inner wall 52 with the surface of ring 73 that does not have a beveled edge to form connection 77, and spacer ring 71 is brazed or soldered to corresponding middle wall 50 with the surface of ring 71 that does not have a beveled edge to form connection 75.

A gap G2 remains between side surface of spacer ring 73 having beveled edge with angle $\alpha 1$, and a gap G3 remains between side surface of spacer ring 71 having beveled edge with angle $\alpha 2$. Next, gaps G2, G3 are filled with a brazing material 85, 87 to hermetically provide seals 51, 49 for vacuum spaces V3 and V4. Also, in the variant shown, spacer ring 73 has a width in a z-direction of D1 that is smaller than a width D2 of spacer ring 71. The inner area 60 that is provided inside inner cylindrical casing 20 and outer cylindrical casing 40 is thereby sealed by two vacuum spaces, being V1 and V2 at the side walls 23 and bottom portion 21, and by two vacuum spaces V3 and V4 in an area of lid portion 41. In addition, in an area of side walls 23 of the positive z-direction close to lid portion 41, four vacuum chambers overlie each other. It is not necessary that a spacer ring have a beveled edge, although such edges are useful.

The above described embodiment of a vacuum insulated structure 10 presents several advantages over conventional vacuum insulated structures. First, the presence of at least two vacuum spaces V1, V2 and/or V3, V4 along any line from inner area 60 to the outside of structure 10 allow to thermally arrange vacuum spaces in series to provide for improved insulation. Conventionally, to increase insulation, the volume occupied by a vacuum chamber is increased, by simply increasing distance between the two walls that form a chamber. However, in certain applications, not enough space is available to simply increase the volume of chamber. Without being bound to any particular theory, the present disclosure provides a solution that allows to substantially increase the insulation capacity without having to increase the overall spacer occupied by a vacuum chamber structure.

Moreover, the presence of two or more vacuum spaces V1-V4 in series also allows adds an additional chamber for redundancy purposes. If a vacuum chamber leaks, for example due to aging of seals or a mechanical impact, a second, redundant vacuum chamber is still present to provide insulation. Also, the arrangement of a shared middle layer 50, 30 for two chambers allows to make side walls 23, upper lid 41 and bottom portion 21 that have a mechanical element fully inside the vacuum structure that serves as an additional insulation barrier for thermal energy and acoustic noise, because the inner walls 26, 46 and 32 are in contact with inner area 60, and outer walls 22, 28, 48, and 42 are in contact with an environment surrounding the vacuum insulated structure 10. Therefore middle walls 30, 50, and middle walls 24, 44 are shielded from direct exposure in both directions, to the inner area 60 and the outside area. Moreover, the sharing of common middle wall 30, 50 for both spaces V1 and V2 as well as V3 and V4 allow to reduce weight and components used, as compared to a solution where there are two separate walls. Conventionally, to improve vacuum insulation, two entirely separate vacuumized spaces are used that do not share a common middle wall 30, 50, and are therefore heavier and more expensive.

Figure 4:
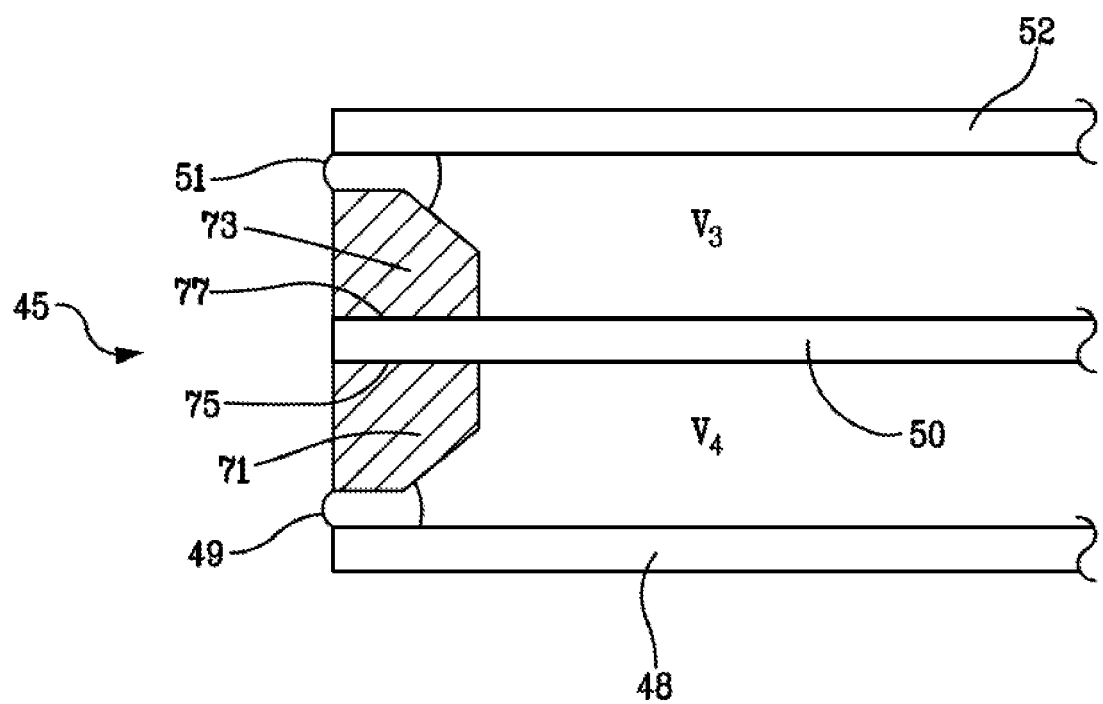
FIG. 4 shows a cross-sectional view of a peripheral edge of a casing of the vacuum insulated structure, according to still another embodiment of the present invention.

FIG. 4 shows a close up cross-sectional view of upper edge 45 of inner cylindrical casing 20, according to still another embodiment of the present invention. In this embodiment, spacer rings 73 and 71 are attached to both middle wall 50 on each side, so that the seal 49 is arranged between spacer ring 71 and outer wall 48, and seal 51 is arranged between spacer ring 73 and inner wall 52. This allows to first attach spacer rings 71, 72 to middle wall 50 in the same process step, before forming seals 49, 51. Seals 49 and 51 may be spaced out from each other so that a distance between locations seal 49 and seal 51 is maximized, so that seals 49 and 51 can be individually formed further processing of the casing 20, while middle wall 50 can serve as a heat barrier to prevent a thermal process for forming one seal having an impact on an already formed seal.

FIGS. 5A-5D represent stages of an exemplary method to manufacture edge 45 of outer cylindrical casing 40, and to provide for vacuum spaces V3 and V4, showing cross-sectional views of the edge 45. Spacer ring 71 is attached to middle wall 50 by soldering. Next, vacuum for vacuum space V4 between walls 48 and 50 is formed. Vacuum space V4 may be evacuated to form a vacuum through a vent 81 located adjacent to edge 45 of wall 48. Vent 81 is a small gap between the end of wall 48 and spacer ring 71, and is formed circumferentially around edge 45. Vacuum space V4 may be evacuated by placing the entire structure including walls 48, 50 and spacer ring 71 into a vacuum chamber and then drawing a vacuum in the chamber. As the pressure in the vacuum chamber decreases, gas (usually air) escapes from vacuum space V4 via the vent 81. Other methods for applying suction to the vent 81 may alternatively be used. The evacuation of for vacuum space V4 achieves a pressure lower than the pressure applied to the vent 81 (i.e., the level of vacuum achieved in for vacuum space V4 is deeper than the level of vacuum applied to the vent 81) as a result of the geometry of spacer ring 71 bounding for vacuum space V4 in the vicinity of the vent 81.

A sidewall of spacer ring 71 may be disposed in the vicinity of the vent 81 so as to preferentially direct gas molecules toward the vent 81 in an ultra-low pressure free molecular flow regime in which the frequency of gas molecule collisions with the wall 48 and spacer ring 71 exceeds the frequency of gas molecule collisions with each other. Without being bound to any particular theory, the relative geometry of wall 48 and spacer ring 71 adjacent to vent 81 has a guiding effect on gas molecules in a free molecular flow regime so that the flux of gas molecules out the vent 81 is greater than the flux of gas molecules into the vent 81. A highly insulating vacuum space V4 having a low vacuum created by such geometry can be used in devices of miniature scale or in devices having insulating spaces of extremely narrow width. For example, a spacing between outer wall 48 and middle wall 50 can be in the order of 0.001 mm to about 5 mm, or from about 0.01 mm to about 1 mm, or even from about 0.1 mm to about 0.5 mm.

Figure 5A:
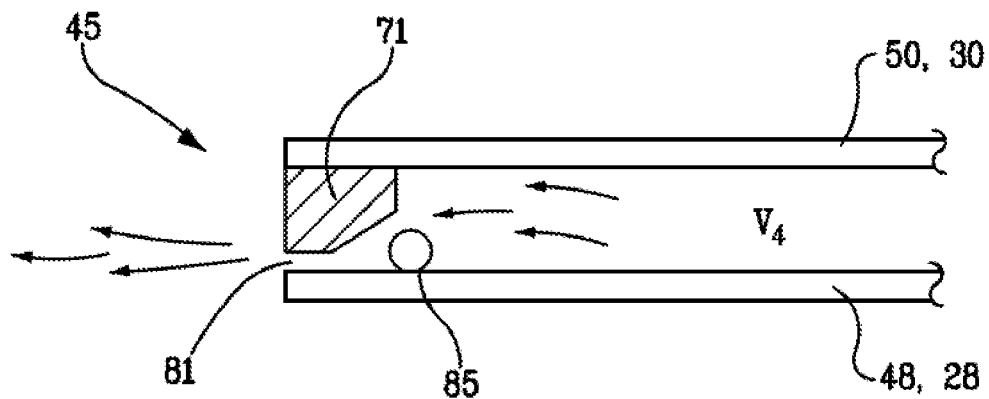
FIGS. 5A-5D show different stages of a method of manufacturing a vacuum insulated article.

While vacuum is being applied to the vent 81, outer wall 48, middle wall 50, and spacer ring 71 can be heated to accelerate the motion of the gas molecules within vacuum space V4, so as to further bias the flux of gas molecules outward from the vent 81 as compared with inward into the vent 81 toward vacuum space V4. The temperature used for the heating is suitably lower than the temperature used to bond spacer ring 71 to middle wall 50, so that the structural integrity of bond between spacer ring 71 and middle wall 50 is maintained. For example, outer wall 48, middle wall 50, and spacer ring 71 may be heated in a combined heating and vacuum chamber to an elevated temperature and held at that temperature for a period of time during the evacuation process. Longer hold times may be used to further increase the vacuum achieved in vacuum space V4. After a desired level of vacuum has been achieved in vacuum space V4, vent 81 may be sealed to maintain the vacuum. In the embodiment shown, vent 81 is sealable by a first braze material 85 that melts and flows into the vent 81 when heated to a brazing temperature, so that end of outer wall 48 is brazed to spacer ring 71 and vacuum space V4 is sealed off by seal 51. To seal vent 81, a bead of first braze material 85 is positioned an inner surface of outer wall 48 facing middle wall 50, slightly within vacuum space V4, near vent 81, as shown in FIG. 5A. Before heating and starting the vacuum process, the bead of first braze material 85 may be solid and is preferably adhered to inner surface of outer wall 48 to form seal 51.

Figure 5B:
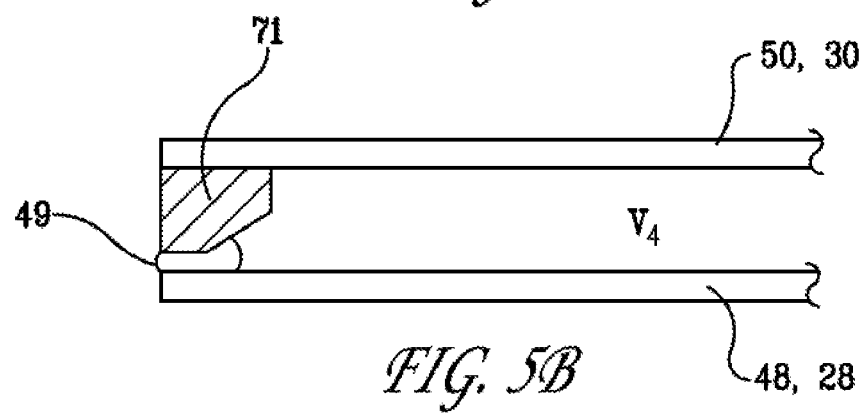

The first braze material 85 is positioned near vent 81 such that during the air evacuation process but before the brazing process, vent 81 is not blocked by the braze material 85. Toward the end of the evacuation process, as the desired level of vacuum is being achieved in vacuum space V4, sufficient heat is applied to outer wall 48 and spacer ring 71 to melt the first braze material 85 such that it flows by capillary action into vent 81. The flowing braze material 85 seals vent 81 and blocks the evacuation path from vacuum space V4, as shown in FIG. 5B. Flowing of the first braze material 85 is facilitated by any preheating that occurs by heating of outer wall 48, middle wall 50 and spacer ring 71 during the evacuation phase in order to enhance the ultimate level of vacuum achieved in vacuum space V4. After maintaining a sufficient temperature for a sufficient amount of time, first braze material 85 forms an alloyed joint or seal 51 between spacer ring 71 and outer wall 48. The joint formed by the first braze material 85 is then allowed to cool, so as to solidify and seal vent 81. Alternatively, other processes can be used for sealing vent 81, including but not limited to metallurgical processes or a chemical processes, such as placement of a sealing material and then solidification (e.g., via chemical or radiation exposure) of that material. As one non-limiting example, a use may place a polymeric sealing material at the vent and then solidify that material by exposing the material to UV radiation. Air- or gas-curable materials are also considered suitable sealing materials. After the joint by brazing material 85 is formed, due to the U-shaped cross section of outer wall 48 and middle wall 50, vacuum space V4 is sealed off.

Figure 5C:
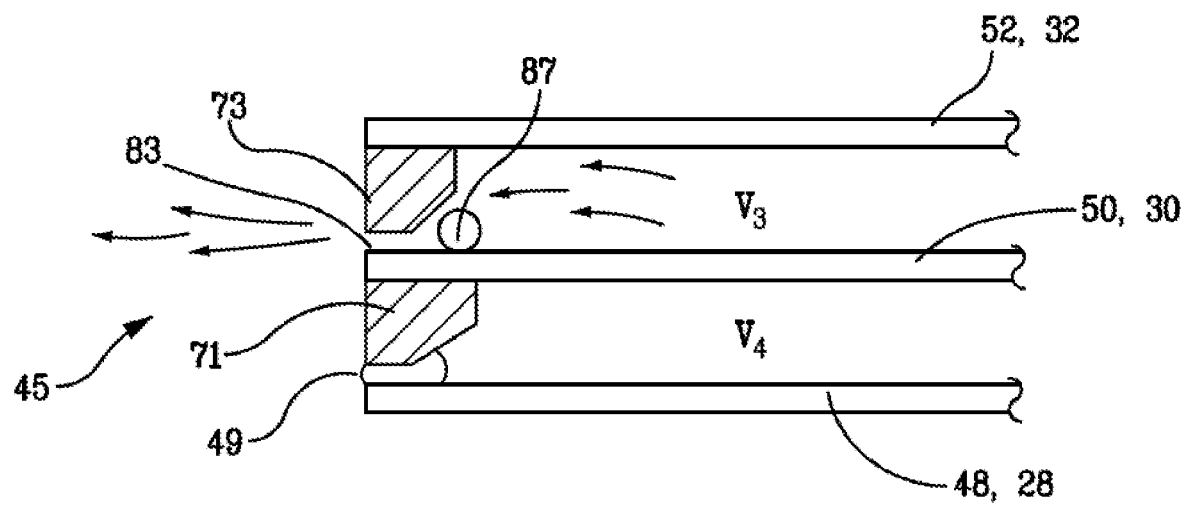
Figure 5D:
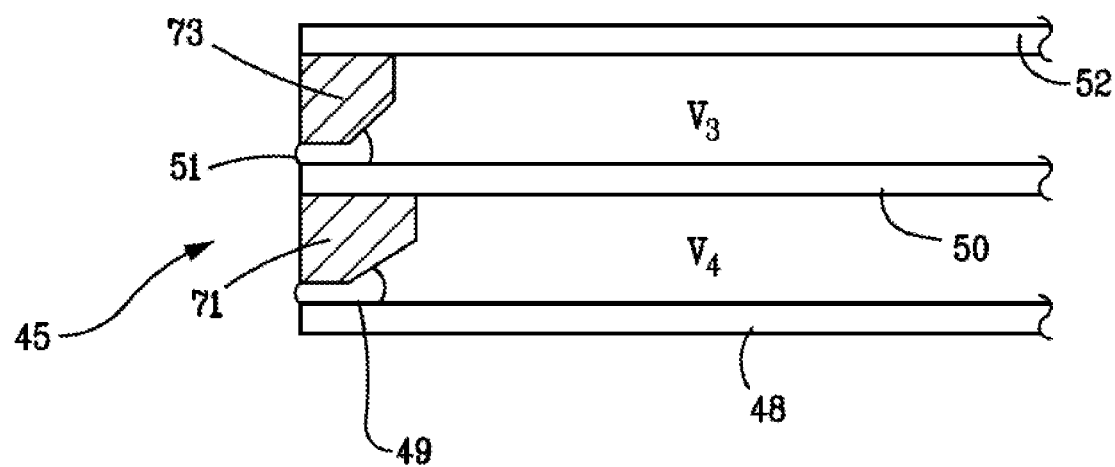

As shown in FIG. 5C, the sealing process may be repeated for vacuum space V3, in which process vent 83 is sealed by second braze material 87. During this process, the temperature of middle wall 50, inner wall 52, and spacer ring 73 is kept higher than a temperature of outer wall 48 and spacer ring 71, so that the joint formed by first braze material 85 does not melt or lose its structural integrity when forming the joint with second braze material. Next, as shown in FIG. 5D, vacuum seals 49 and 51 are formed so that the vacuum spaces V3 and V4 remain vacuum-sealed. In the variant shown, peripheral edges of outer wall 48, middle wall 50, and inner wall 52, as well as surfaces exposed towards the negative z-direction are arranged flush to each other to form edge 45. It should be understood, however, that the edges or ends of adjacent components need not necessarily be arranged flush with one another, although a flush arrangement may be especially suitable.

In an alternative embodiment, sealing the vents 81, 83 shown in FIG. 5A and FIG. 5C is performed simultaneously. In this embodiment, first and second braze materials 85, 87 are placed on outer wall 48 and middle wall 50, respectively, in proximity to vents 81, 83 to form a circular bead close to the peripheral edges of outer wall 48, and inner wall 50, after spacer ring 71 is attached to middle wall 50. Spacer rings 71 and 73 are first attached to the respective walls 50, 52 by soldering using a temperature that is higher than the temperature required to melt the first and second brazing material 85, 87, before the braze materials 85, 87 are heated. Thereby, the integrity of the connection of spacer rings 73, 71 to middle wall 50 and inner wall 52 is preserved. Then, outer wall 48, middle wall 50, and inner wall 52, as well as spacer rings 73, 71 can be heated together in an annealing step to reduce mechanical stresses formed during the sealing. The method of FIGS. 5A-5D of forming the sealed edge 45 is described with respect to vacuum spaces V3 and V4, but vacuum spaces V1 and V2 can be made in an analogous fashion, using walls 32, 30, 28, instead of walls 52, 50, 48, respectively. It should be understood that any (or all) of the foregoing may be used in connection with any article or method of the present disclosure.

Figure 6:
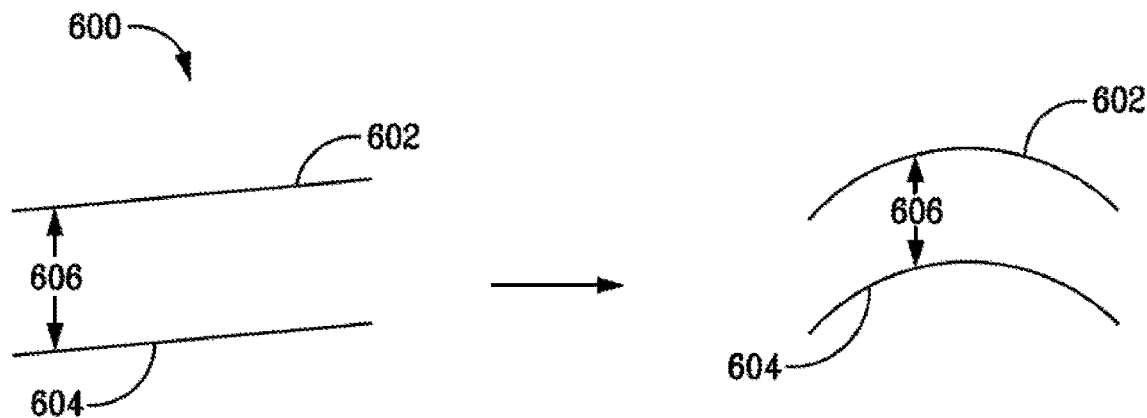
FIG. 6 shows an alternative embodiment of the disclosed technology.

The present disclosure provides further methods of manufacturing vacuum sealed articles. In some instances, creation of a vacuum (such as described elsewhere herein) between two surfaces can result in the finished article having a curvature or bend at a vacuum-insulated region. As shown in FIG. 6, a user operating on article 600 forms a vacuum in the gap 606 between walls 602 and 604. In a beginning state, walls 602 and 604 include a planar region. Following formation of the vacuum and sealing the gap 602 between the walls, however, the final article 600 may exhibit a curved portion, as creation of the vacuum effects bending of walls 602 and 604. It should be understood that curvature is not an inevitable result of forming a vacuum between two surfaces, as curvature may be the result of particular material characteristics (thickness, material type) and processing conditions and may not necessarily occur in all instances.

In instances where a user may desire to form a finished article that includes a flat region, a user may form a vacuum as described elsewhere herein, but may do so by beginning with a workpiece that has one or more curved walls. (It should be understood that the term "curved" refers to a curved portion; i.e., a "curved" surface may include flat and curved regions.)

Figure 7:
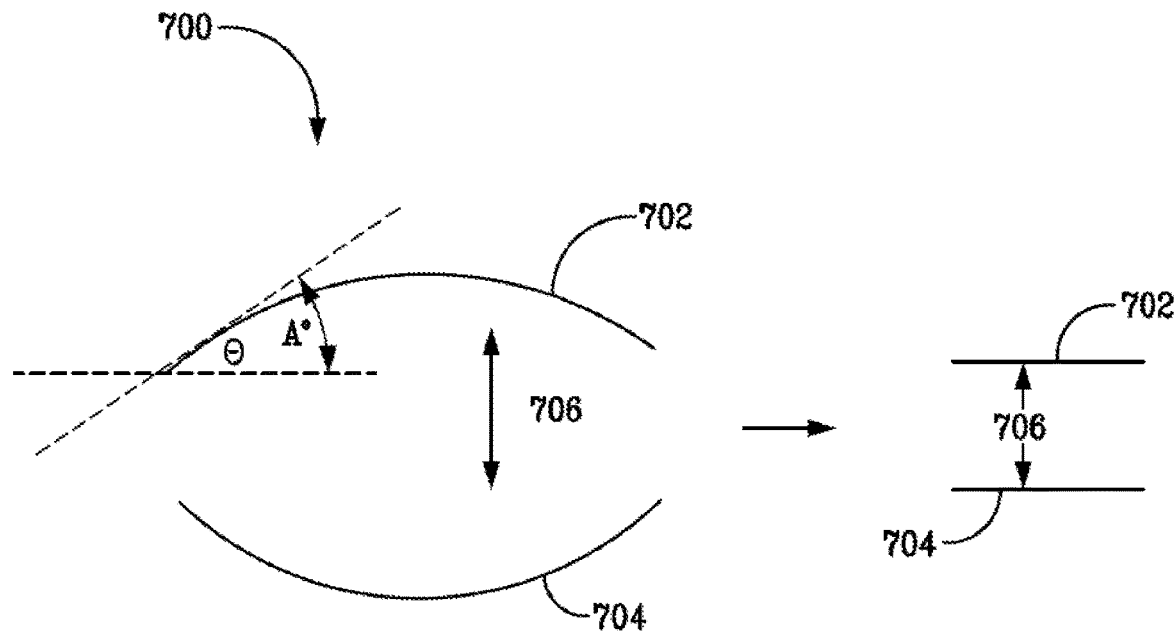
FIG. 7 shows an alternative embodiment of the disclosed technology.

As shown in FIG. 7, a user may begin with an article 700 that includes walls 702 and 704; as shown in the figure, walls 702 and 704 both include a curved portion. The user may form a vacuum between the walls in gap 706 as described elsewhere herein, and as shown in the figure, formation of the vacuum effects bending of the walls such that a curved portion of the article is at least partially straightened as shown in the right-hand panel of the figure. In this way, a user can modulate the curvature of finished articles.

In some embodiments, a tangent to a point on the curved wall may be at an angle A (as shown in FIG. 7) of from about 0.01° to about 90°, from about 1° to about 75°, from about 5° to about 45°, or even from about 10° to about 30° from the major axis of the wall. For illustration purposes, this is shown in FIG. 7 as an angle from the horizontal. The wall may be processed—e.g., via formation of a vacuum between the wall and a neighboring wall—so that the aforementioned angle is altered by at least about 0.01°, 1°, 10°, 30°, 45°, or even by 60° or even by about 90°. It should be understood that in a given article, it is not necessary for both walls to include curved portions, though some articles do include such portions. In some embodiments, a first wall may be straight and a second wall may include a curved portion. A user may apply heating or cooling to an article during processing so as to module changes in the curvature of a wall.

Figure 8:
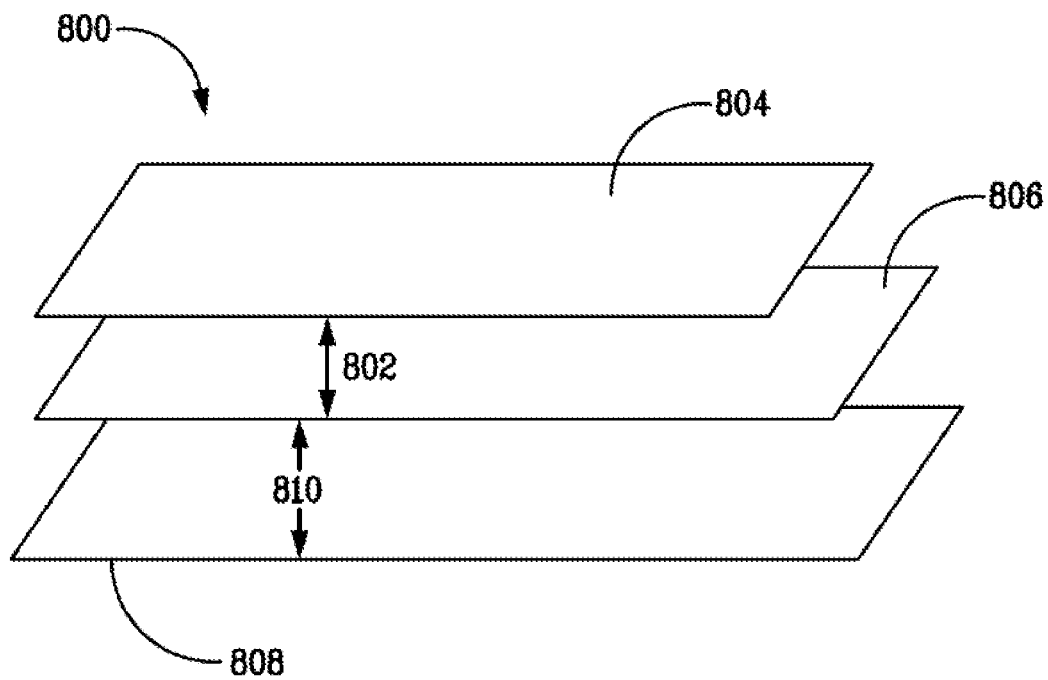
FIG. 8 an alternative embodiment of the disclosed technology.

Although a number of exemplary embodiments provided herein present articles that include concentric tubes, it should be understood that articles according to the present disclosure may feature planar walls, non-tubular walls, or even—in some embodiments—tubes that are not concentric. FIG. 8 provides one such example—as shown in that figure, an article 800 according to the present disclosure may include a vacuum formed in the gap 802 between surfaces 804 and 806. The article may also optionally include a third wall 808 such that there is an additional vacuum formed in the gap 810 between second wall 806 and third wall 808. The ratio of the width of gap 802 to gap 810 can be in the range of from about 100:1 to about 1:100, or from about 10:1 to about 1:10. It should be understood that articles according to the present disclosure may include a planar region as well as two vacuum insulated spaces; it is not a requirement that the vacuum spaces be formed between concentrically-positioned tubes.

Figure 9:
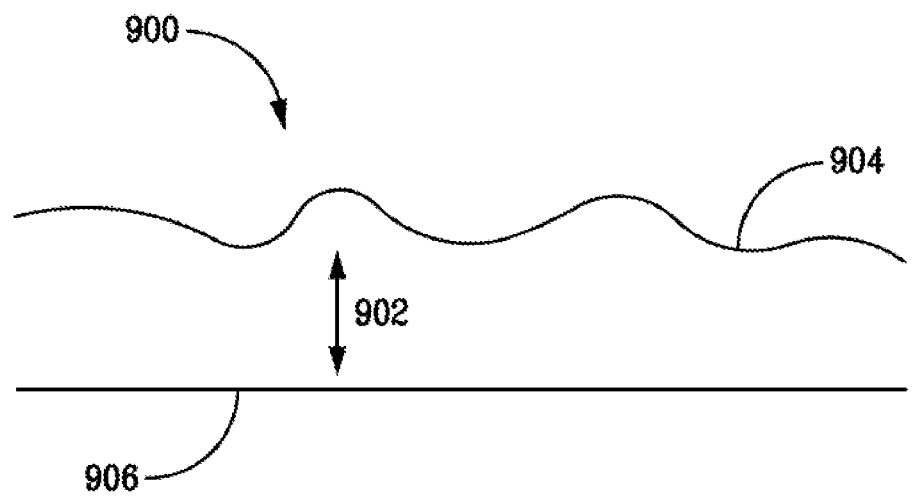
FIG. 9 shows an alternative embodiment of the disclosed technology.

It should be understood that a wall may include one or more curved regions. As shown in FIG. 9, article 900 includes a vacuum formed in the gap 902 between walls 904 and 906; as shown in the figure, wall 904 includes undulations. The gap 902 between the walls need not be constant. An undulation may increase the minimum gap by 5, 10, 15, 20, 25, 35, 50, or even 80%. Without being bound to any particular theory, vacuums may be formed according to the disclosures of U.S. Pat. Nos. 7,681,299 and/or 7,374,063, both of which are incorporated herein by reference for any and all purposes.

Figure 12:
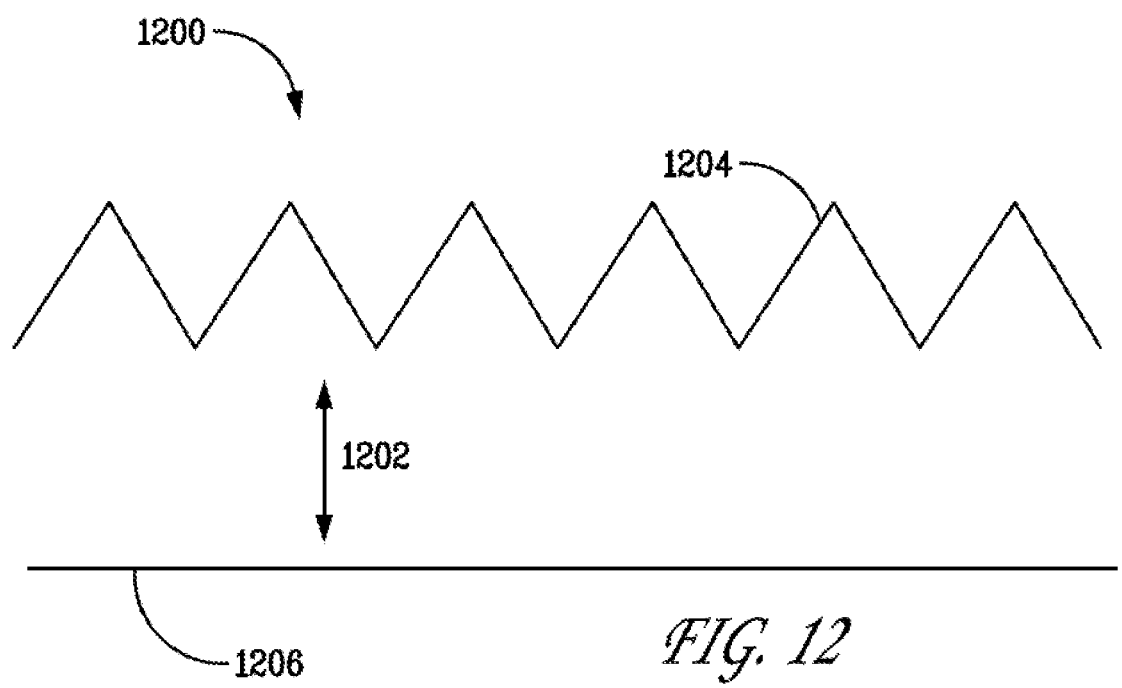
FIG. 12 shows an alternative embodiment of the disclosed technology.

A wall may be formed with a ridged, waved, slotted, or other profile that confers additional structural rigidity on the wall. As one example, a wall may have a wavy cross-section, as shown by wall 904 in FIG. 9. A wall may also have a corrugated, ridged, or other non-planar structure that confers additional rigidity onto the wall. An alternative embodiment is shown in FIG. 12. As shown in that figure, article 1200 includes first wall 1204, which wall has a ridged or corrugated profile, which profile confers rigidity on the wall. The first wall 1204 and second wall 1206 define vacuum chamber 1202. In this way, a user may form a vacuum-insulated structure that can maintain its planar configuration under atmospheric pressure. A wall may have a non-planar region and also include a region (which can be the non-planar region) having a corrugated, ridged, or other non-planar structure. As one example, FIG. 12 depicts an article 1200 having corrugated wall 1204. A vacuum space 1202 is present between corrugated wall 1204 and planar wall 1206. The wall may also be attached or otherwise connected with a frame that may be used to maintain the wall in a particular position. As one example, a wall of an article according to the present disclosure may be attached to frame so as to maintain the wall's surface profile (curvature, planarity, or both) under various ambient conditions.

Vacuum insulated articles according to the present disclosure may also, in some embodiments, include an outer wall, an inner wall, and a middle wall. At least one of the outer wall, inner wall, or middle wall may have a planar region. The articles may include an area between the inner wall and the middle wall that defines a first sealed insulating space, and an area between the middle wall and the outer wall defining a second sealed insulating space; and at least one of the first sealed insulating space and second sealed insulating space being at less than ambient pressure. One such exemplary article is shown in FIG. 8. It is not a requirement that both sealed insulating spaces be at below ambient pressure (e.g., at a vacuum), but embodiments where both such spaces do contain a vacuum are considered especially suitable.

Also as described elsewhere herein, at least one of the walls may have a planar region; in some embodiments, at least two of the outer wall, the inner wall, and the middle wall have planar regions.

An article according to the present disclosure may include a spacer disposed between the inner wall and the middle wall. The spacer may, in some embodiments, include an edge (which may be beveled) that faces at least one of the inner wall and the middle wall. Beveled spacers are described and depicted elsewhere herein.

Articles according to the present disclosure may, in some embodiments, include a second spacer disposed between the middle wall and the outer wall. The second spacer may include an edge (e.g, a beveled edge) that faces at least one of the inner wall and the middle wall.

The present disclosure also provides methods of fabricating articles. These methods suitably include arranging first and second surfaces (e.g., walls) at a distance from one another so as to define an overlap volume between the surfaces that has at least one opening placing the overlap region into fluid communication with the environment exterior to the overlap volume. The user may maintain a spacing between the surfaces via placing a spacer or spacers between the surfaces. Alternatively, one or more surfaces may include a curvature, protrusion, or other geometric feature that maintains the spacing. At least one of the first and second surfaces suitably has a first region that has a curvature.

A user suitably effects a vacuum on the overlap volume by causing air to escape the overlap volume. Methods of applying vacuum are known to those of ordinary skill in the art and are described elsewhere herein. The overlap volume is then suitably sealed (e.g., via metal brazing) so as to preserve the vacuum within the overlap volume. The methods are suitably performed under such conditions that the curvature of the first region is changed. In this way, the methods may be used to produce an article having a planar region after starting with curved surfaces.

As one example, a user may overlap a first planar wall and a second planar wall. The user may place a spacer, such as a C-shaped spacer between the walls and may even fuse the spacer to the walls such that the C-shaped spacer defines a circular volume between the first and second walls. The user may then draw a vacuum on the C-shaped volume and then seal the opening in the C-shaped volume so as to define a sealed, vacuum-containing volume between the first and second walls. The resultant article may feature planar walls; such an article may be characterized as being an insulating plate. As described elsewhere herein, the walls of an article may begin as curved and be processed so as to alter—or even eliminate—the curvature of the walls. As described elsewhere herein, an article may have vacuum insulated spaces between first and second walls and between second and third walls.

Other methods of forming a vacuum insulated article are provided. These methods suitably include forming a vacuum in a first space defined between an outer wall and a middle wall, at least one of the outer and middle walls having a planar region that overlaps the first space; forming a vacuum in a second space defined between the middle wall and an inner wall, at least one of the middle and inner walls having a planar region that overlaps the second space; sealing the first space so as to maintain the vacuum in the first space; and sealing the second space so as to maintain the vacuum in the second space. Suitable methods of forming vacuums are described elsewhere herein.

Still other methods of method of forming vacuum insulated articles are provided. These methods include, using (a) a first tube having a first diameter defined by an outer wall, (b) a second tube having a second diameter defined by a middle wall, the second diameter being smaller than the first diameter, and (c) a third tube having a third diameter defined by an inner wall, the third diameter being smaller than the second diameter.

A user suitably positions the third tube into the second tube to form a first annular insulating space between the third tube and the second tube. In some embodiments, the ends of the second tube and the third tube are positioned adjacent to each other to form a first circular vent between the end of the second tube and the end of the third tube. It is not a requirement, however, that the ends of the second and third tubes be positioned so that they are co-terminal with one another, as the end of the second and the end of the third tube may—in some embodiments—be separated from one another by a distance. As one example, the second tube may end at a distance of about 1 cm from the end of the third tube. The tubes' ends may be separated from one another by from about 0.001 mm to about 1 mm, 10 mm, or even 50 mm, in some embodiments. In other embodiments, the tubes may be co-terminal with one another.

A user may suitably draw a vacuum on the first annular insulating space by causing air to escape through the first circular vent and may also suitably seal the first circular vent to preserve the vacuum within the first annular insulating space. Methods for applying vacuum and sealing the space are known to those of ordinary skill in the art and are described elsewhere herein.

The methods may further include positioning the second tube into the first tube to form a second annular insulating space between the second tube and the first tube. As described above, the ends of the first tube and second tubes may be positioned adjacent to each other to form a second circular vent between the end of the first tube and the end of the second tube; also as described elsewhere herein, the tubes' ends may or may not be co-terminal with one another, and the ends may be separated from one another by a distance, e.g., from about 0.001 mm to about 50 mm and all intermediate values. The methods also include drawing a vacuum on the second annular insulating space by causing air to escape through the second circular vent; and sealing the second circular vent to preserve the vacuum within the second annular insulating space; techniques for the foregoing will be known to those of ordinary skill in the art.

The present disclosure further provides vacuum insulated articles. These articles suitably include an outer wall, an inner wall, and a middle wall. The walls may, in some embodiments, be arranged concentrically relative to one another. In particularly suitable embodiments, each of the outer wall, the inner wall, and the middle wall have a cylindrical shape, although non-cylindrical shapes (e.g., oblong or ovoid) are also considered suitable.

The articles suitably include an area between the inner wall and the middle wall that forms a first insulating space, The articles also suitably include an area between the middle wall and the outer wall forming a second insulating space.

The article may include in some embodiments a vent communicating with the first insulating space. This vent may be annular in shape, but this is not a requirement, as the vent may be slot-, round, oblong, or other-shaped. The article may also include a second vent that communicates with the second insulating space; the second vent. The second vent may be annular in shape, but this is not a requirement, as the vent may be slot-, round, oblong, or other-shaped. Articles suitably include a seal that seals the first insulating space, which seal may be disposed at the first vent. An article may also suitably include a second seal sealing the second insulating space, which seal may be disposed at the second vent. Metal (e.g., brazed metal) is considered an especially suitably sealing material.

Articles according to the present disclosure may include a fluid source in fluid communication with a volume at least partially enclosed within the article. As one non-limiting example, an article according to the present disclosure may be in the form of a cylindrical shell comprised of three (outer, middle, and inner) walls with insulated spaces between the walls. The interior wall may define a space (i.e., a volume) enclosed within the article. This space is thus insulated by the article's walls from the environment exterior to the article. A fluid source (e.g., liquid nitrogen, heated fluid, cooled fluid, etc.) may be coupled or placed into communication with the interior volume of the article. As one example, such an article might be coupled to a source of heated fluid so that a user could manipulate the insulated article and direct the flow of the heated fluid (e.g., as a sprayer, cannula, or injector) while also remaining insulated from the heat by the article itself.

At least one of the first, second, or third walls may have a cross-sectional dimension in the range of from about 0.01 mm to about 2 mm, or even to about 5 mm, about 10 mm, or even about 20 mm. It should be understood that the high insulating ability of the doubly-insulated articles allows for reduced wall thickness. At least one of the first, second, and third walls has a cross-sectional dimension in the range of from about 0.1 mm to about 1 mm, or even from about 0.5 mm to about 0.75 mm.

To enhance the insulating properties of the sealed vacuum, an optical coating having low-emissivity properties may be applied to the outer surface of an article. The reflective surface of the optical coating limits passage of heat-transferring radiation through the coated surface. The optical coating may comprise copper, a material having a desirably low emissivity when polished. Copper, however, is subject to rapid oxidation, which may increase its emissivity. Highly polished copper, for example, can have an emissivity as low as approximately 0.02 while heavily oxidized copper may have an emissivity as high as approximately 0.78. To facilitate application, cleaning, and protection of the oxidizing coating, the optical coating may be using a radiatively-coupled vacuum furnace prior to the evacuation and sealing process. When applied in the elevated-temperature, low-pressure environment of such a furnace, any oxide layer that is present will be dissipated, leaving a highly cleaned, low-emissivity surface, which will be protected against subsequent oxidation within the vacuum space when the evacuation path is sealed.

When surfaces (e.g., tubes) are subjected to bending loads, contact may occur between adjacent surfaces while the loading is imposed. The tendency of concentric tubes bent in this fashion to separate from one another, or to "springback," following removal of the bending loads may be sufficient to ensure that the tubes separate from each other. Contact that does remain, however, can in some instances provide a detrimental "thermal shorting" between surfaces. To provide for protection against such thermal shorting, a structure may include a spacer material. Such a material may be, e.g., yarn or braid comprising micro-fibers of ceramic or other low conductivity material. The spacer layer provides a protective barrier that limits direct contact between the tubes without detrimentally limiting the flexibility of the structure. Such a spacer layer may be present between concentrically-arranged tubes, but may also be disposed between adjacent planar surfaces.

Figure 13A:
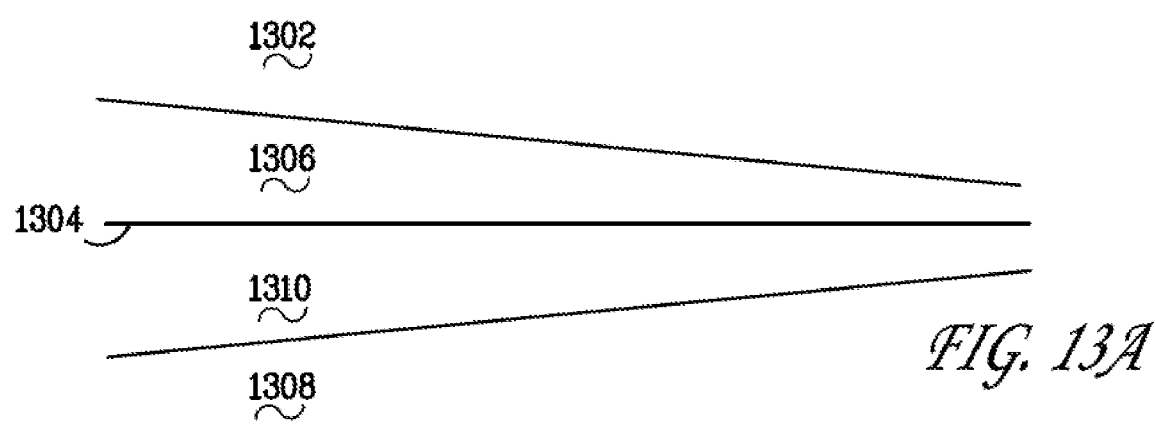
FIG. 13A depicts an alternative embodiment of the disclosed technology with chambers that have exits that are characterized as having a converging angle.

FIG. 13A depicts an alternative embodiment of the disclosed technology. As shown in that figure, a multi-chamber article may include chambers that have exits that are characterized as having a converging angle. As explained in U.S. Pat. Nos. 7,681,299 and 7,374,063, this converging exit acts to encourage molecules within the chambers to exit the chamber, improving the vacuum within the chamber. As shown in that figure, an article has a first wall 1302 and second wall 1304 that defines first vacuum chamber 1306. As shown at the right side of that figure, the chamber 1306 has a converging region that encourages the exit of molecules from within that chamber during chamber fabrication. Third wall 1308 defines second vacuum chamber 1310, which second chamber 1310 has a converging region as shown in the right-hand side of the figure. As shown in that figure, the first chamber 1306 and second chamber 1310 have converging exits at the same ends of the chambers.

Figure 13B:
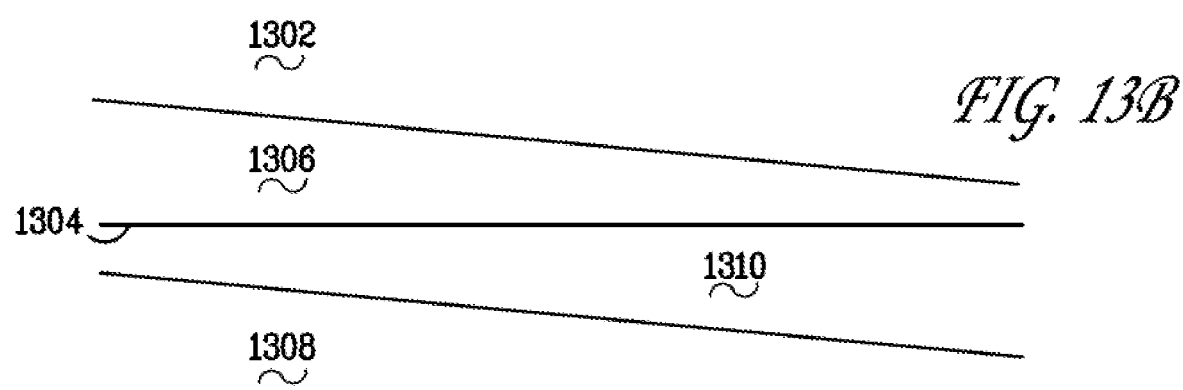
FIG. 13B depicts a further alternative embodiment of the disclosed technology.

FIG. 13B shows a further embodiment of the disclosed technology. As shown in that figure, first wall 1302 and second wall 1304 define first vacuum chamber 1306. Second wall 1304 and third wall in turn define second vacuum chamber 1310. As shown in FIG. 13B, first vacuum chamber 1306 and second vacuum chamber 1310 need not have converging exits at the same ends of the chambers. As shown in illustrative FIG. 13B, the first chamber 1306 has an exit at the right-hand side of the chamber, and the second chamber 1310 has an exit at the left-hand side of the chamber.

Figure 10:
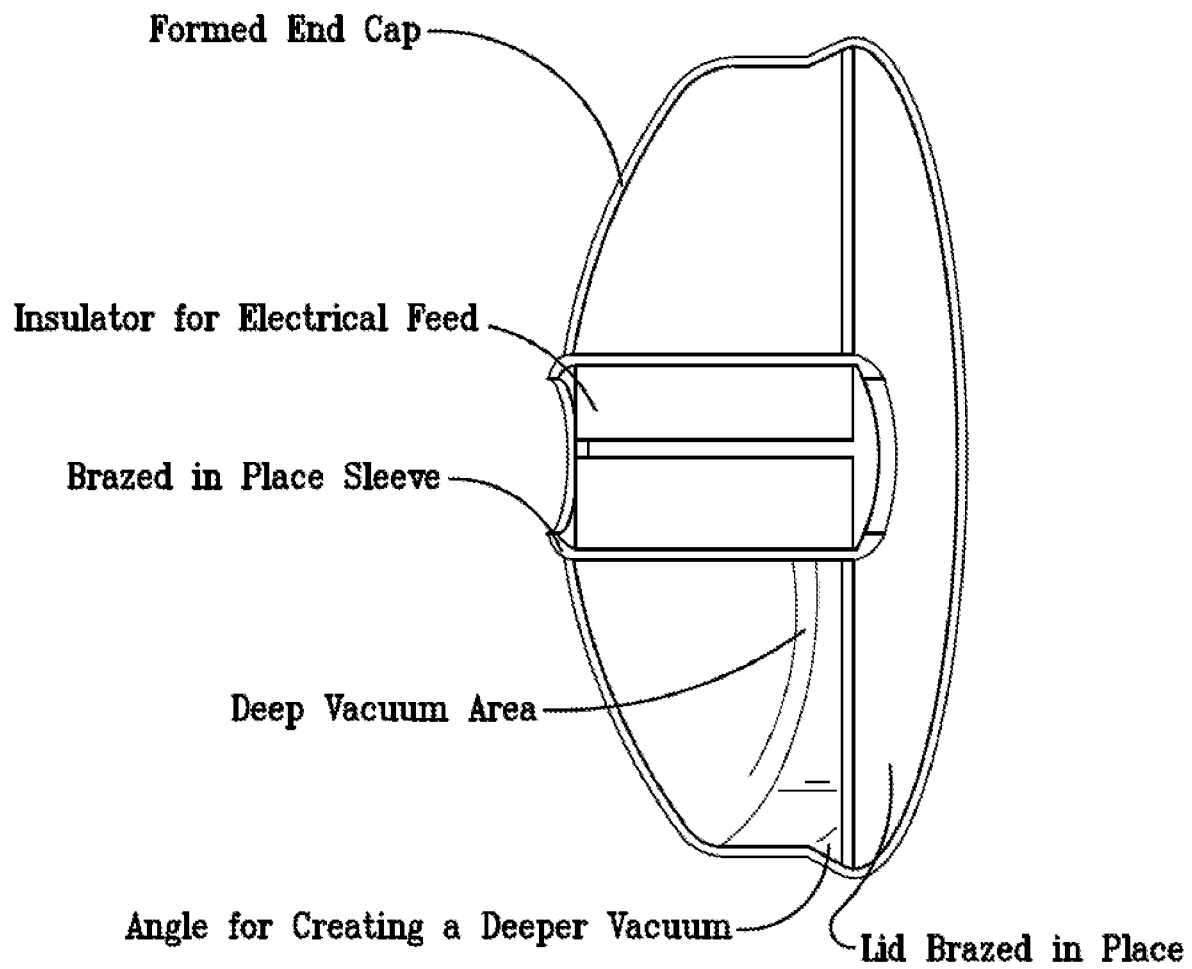
FIG. 10 shows a container end cap according to the present disclosure.
Figure 11:
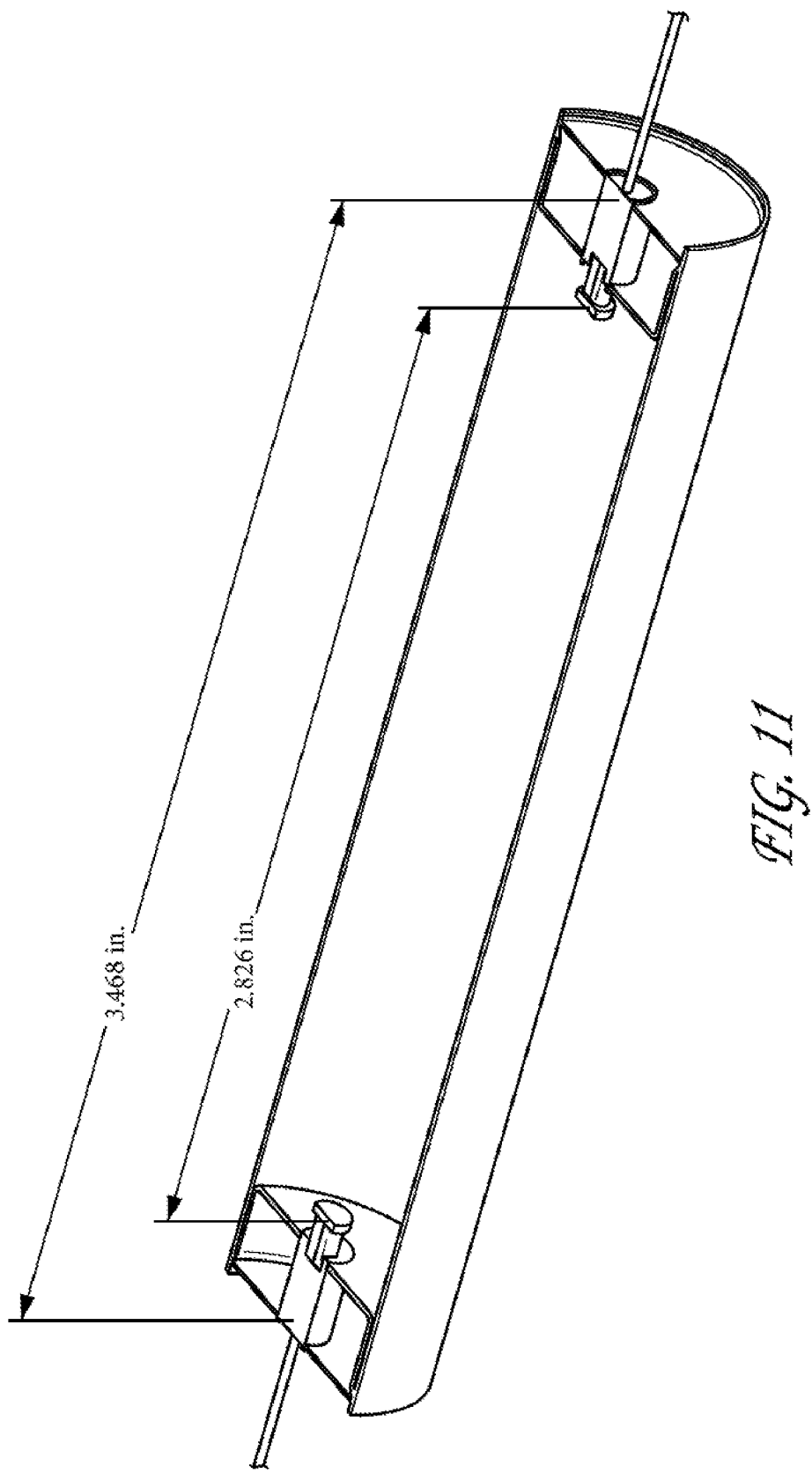
FIG. 11 shows a container according to the present disclosure.

FIGS. 10 and 11 depict further embodiments of the disclosed technology. FIG. 10 depicts an end cap structure. The depicted cap includes a lid brazed in place onto the lid. The lid also includes an insulator through which an electrical conductor or other feed may be passed. The insulated may be disposed within a brazed-in-place sleeve disposed in the cap. The cap also suitably includes a vacuum area; the vacuum area may be defined by a second vacuum chamber as described elsewhere herein. FIG. 11 illustrates a container that includes an end cap according to FIG. 10. (The measurements shown in FIG. 11 are exemplary only and do not limit the figure or this disclosure.)

As shown in FIG. 11, electrical feeds enter the container through end caps disposed at either end of the container; the container itself may include vacuum-insulated walls. Such containers may be used as, e.g., battery storage containers or containers for other heat-sensitive articles.

The foregoing describes the invention in terms of embodiments foreseen by the inventors for which an enabling description was available, notwithstanding that insubstantial modifications of the invention, not presently foreseen, may nonetheless represent equivalents thereto. The following aspects are illustrative only and do not serve to limit the scope of the present disclosure or the claims appended hereto.

Aspect 1. A vacuum insulated article, comprising: an outer wall, an inner wall, and a middle wall, each of the outer wall, the inner wall, and the middle wall having a cylindrical shape that are concentric to each other. The article may include a first insulating space formed between the outer wall and the middle wall and a second insulating space formed between the middle wall and the inner wall.

The article may also include a first vent communicating with the first insulating space to provide an exit pathway for gas molecules from the first insulating space, the first vent being sealable for maintaining a first vacuum within the first insulating space following evacuation of gas molecules through the first vent. It should be understood that the sealable vent may be closed or sealed. The article may also include a second vent communicating with the second insulating space to provide an exit pathway for gas molecules from the second insulating space, the second vent being sealable for maintaining a second vacuum within the second insulating space following evacuation of gas molecules through the second vent; a first seal sealing the first insulating space at the first vent; and a second seal sealing the second insulating space at the second vent.

One or both of insulating spaces may suitably at less than atmospheric pressure. The pressure within an insulating space is suitably less than 760 Torr. Pressures of about $10^{-1}$, $10^{-2}$, $10^{-3}$, $10^{-4}$, $10^{-5}$, $10^{-6}$, and even $10^{-7}$ Torr are all considered suitable.

Aspect 2. The vacuum insulated article of aspect 1, wherein the middle wall is formed of a layer of sheet metal, a first surface of the sheet metal being in contact with the first insulating space, and the second surface of the sheet metal being opposite the first surface of the sheet metal and being in contact with the second insulating space.

Aspect 3. The vacuum insulated article of any of aspects 1-2, wherein at least one of the first insulating space and the second insulating space has a cross-sectional dimension in the range of from about 0.01 mm to about 2 mm.

Aspect 4. A vacuum insulated article, comprising: an outer wall, an inner wall, and a middle wall, each of the outer wall, the inner wall, and the middle wall having a cylindrical shape that are concentric to each other, an area between the inner wall and the middle wall forming a first insulating space, and an area between the middle wall and the outer wall forming a second insulating space; a first circular ring arranged between the inner wall and the middle wall, the first circular ring having a first beveled edge circularly arranged around the first circular ring facing at least one of the inner wall and the middle wall, a first vent formed at the first beveled edge communicating with the first insulating space; a second circular ring arranged between the middle wall and the outer wall, the second circular ring having a second beveled edge circularly arranged around the second circular ring facing at least one of the inner wall and the middle wall, a second vent formed at the second beveled edge communicating with the second insulating space; a first circular insulation seal sealing the first insulating space at the first vent; and a second circular insulation seal sealing the second insulating space at the second vent.

An insulating space may have, as described elsewhere here, a pressure suitably less than 760 Torr. Pressures of about $10^{-1}$, $10^{-2}$, $10^{-3}$, $10^{-4}$, $10^{-5}$, $10^{-6}$, and even about $10^{-7}$ Torr are all considered suitable.

Aspect 5. The vacuum insulated article according to aspect 4, wherein the middle wall is formed of a layer of sheet metal, a first surface of the sheet metal being in contact with the first insulating space, and a second surface opposite the first surface of the sheet metal being in contact with the second insulating space Aspect 6. A vacuum insulated article, comprising: an outer wall, an inner wall, and a middle wall, at least one of the outer wall, inner wall, or middle wall having a planar region, an area between the inner wall and the middle wall defining a first sealed insulating space, and an area between the middle wall and the outer wall defining a second sealed insulating space; and at least one of the first sealed insulating space and second sealed insulating spaces being at less than ambient pressure.

As described elsewhere herein, an insulating space may have, as described elsewhere here, a pressure suitably less than 760 Torr. Pressures of about $10^{-1}$, $10^{-2}$, $10^{-3}$, $10^{-4}$, $10^{-5}$, $10^{-6}$, and even about $10^{-7}$ Torr are all considered suitable.

Aspect 7. The vacuum insulated article of aspect 6, wherein both the first sealed insulating space and second sealed insulating space are at less than ambient pressure.

Aspect 8. The vacuum insulated article of aspect 6, wherein at least two of the outer wall, the inner wall, and the middle wall have a planar region.

Aspect 9. The vacuum insulated article of aspect 6, further comprising a spacer disposed between the inner wall and the middle wall, the spacer having a first beveled edge facing at least one of the inner wall and the middle wall.

Aspect 10. The vacuum insulated article of aspect 6, further comprising a second spacer disposed between the middle wall and the outer wall, the second spacer having a beveled edge facing at least one of the inner wall and the middle wall.

Aspect 11. A method, comprising: arranging first and second surfaces at a distance from one another so as to define an overlap volume between the surfaces that has at least one opening placing the overlap region into fluid communication with the environment exterior to the overlap volume, at least one of the first and second surfaces having a first region having a curvature; effecting a vacuum on the overlap volume by causing air to escape the overlap volume; sealing the overlap volume so as to preserve the vacuum within the overlap volume, the method being performed such that the curvature of the first region is changed.

Suitable methods of effecting a vacuum are described elsewhere herein, e.g., in U.S. Pat. Nos. 7,681,299 and 7,374,063 and in U.S. patent application Ser. No. 12/766, 397.

Aspect 12. The method of aspect 11, wherein the sealing comprises forming a seal by metal brazing.

Aspect 13. A method of forming a vacuum insulated article, comprising: forming a vacuum in a first space defined between an outer wall and a middle wall, at least one of the outer and middle walls having a planar region that overlaps the first space; forming a vacuum in a second space defined between the middle wall and an inner wall, at least one of the middle and inner walls having a planar region that overlaps the second space; sealing the first space so as to maintain the vacuum in the first space; and sealing the second space so as to maintain the vacuum in the second space. The vacuum is suitably less than 760 Torr. Pressures of about $10^{-1}$, $10^{-2}$, $10^{-3}$, $10^{-4}$, $10^{-5}$, $10^{-6}$, and even about $10^{-7}$ Torr are all considered suitable.

Aspect 14. A method of forming a vacuum insulated article, comprising: with (a) a first tube having a first diameter defined by an outer wall, (b) a second tube having a second diameter defined by a middle wall, the second diameter being smaller than the first diameter, and (c) a third tube having a third diameter defined by an inner wall, the third diameter being smaller than the second diameter, positioning the third tube into the second tube to form a first annular insulating space between the third tube and the second tube, such that ends of the second tube and the third tube are positioned adjacent to each other to form a first circular vent between the end of the second tube and the end of the third tube; drawing a vacuum on the first annular insulating space by causing air to escape through the first circular vent; sealing the first circular vent to preserve the vacuum within the first annular insulating space; positioning the second tube into the first tube to form a second annular insulating space between the second tube and the first tube, such that ends of the first tube and the second tube are positioned adjacent to each other to form a second circular vent between the end of the first tube and the end of the second tube; drawing a vacuum on the second annular insulating space by causing air to escape through the second circular vent; and sealing the second circular vent to preserve the vacuum within the second annular insulating space. Suitable pressures for insulating spaces are described elsewhere herein.

Aspect 15. A vacuum insulated article, comprising: an outer wall, an inner wall, and a middle wall, each of the outer wall, the inner wall, and the middle wall having a cylindrical shape, an area between the inner wall and the middle wall forming a first insulating space, and an area between the middle wall and the outer wall forming a second insulating space; a first vent communicating with the first insulating space; a second vent communicating with the second insulating space; a first seal sealing the first insulating space at the first vent; and a second seal sealing the second insulating space at the second vent.

Aspect 16. The article of aspect 15, wherein the outer wall, inner wall, and middle wall are arranged concentric to each other.

Aspect 17. The article of any of aspects 15-16, further comprising a fluid source in fluid communication with a volume enclosed within the article.

Aspect 18. The article of any of aspects 15-17, wherein at least one of the first, second, and third walls has a cross-sectional dimension in the range of from about 0.01 mm to about 2 mm.

Aspect 19. The article of any of aspects 15-18, wherein at least one of the first, second, and third walls has a cross-sectional dimension in the range of from about 0.1 mm to about 1 mm.

Aspect 20. The article of any of aspects 15-19, wherein at least one of the first, second, and third walls has a cross-sectional dimension in the range of from about 0.5 mm to about 0.75 mm.

Aspect 21. A vacuum insulated article, comprising: an outer wall, an inner wall, and a middle wall, an area between the inner wall and the middle wall forming a first insulating space, and an area between the middle wall and the outer wall forming a second insulating space; a first seal sealing the first insulating space at the first vent; and a second seal sealing the second insulating space at the second vent.

Aspect 22. The article of aspect 21, wherein the outer wall, inner wall, and middle wall are arranged concentric to each other.

Aspect 23. The article of any of aspects 21-22, wherein the first insulating space and the second insulating space are at less than atmospheric pressure, e.g., less than 760 Torr. Pressures of about $10^{-1}$, $10^{-2}$, $10^{-3}$, $10^{-4}$, $10^{-5}$, $10^{-6}$, and even about $10^{-7}$ Torr are all also considered suitable.

Aspect 24: A vacuum insulated article, comprising: an outer wall, an inner wall, and a middle wall, an enclosed volume between the inner wall and the middle wall forming a first insulating space and an enclosed volume between the middle wall and the outer wall forming a second insulating space; a first vent communicating with the first insulating space; a second vent communicating with the second insulating space; a first seal sealing the first insulating space at the first vent; and a second seal sealing the second insulating space at the second vent.

It should be understood that although some embodiments (e.g., aspect 1) comprise cylindrical form factors, the present disclosure contemplates other form factors. For example, inner, outer, and middle walls may be arranged in a parallel fashion, as shown in non-limiting FIG. 8 The Aspect 25. The vacuum insulated article of aspect 24, wherein at least one of the first and second insulating spaces has a pressure of less than 760 Torr to about $10^{-7}$ Torr.

Aspect 26. The vacuum insulated article of aspect 24 or aspect 25, wherein at least one of the first insulating space and the second insulating space has a cross-sectional dimension in the range of from about 0.01 mm to about 2 mm.

It should be understood that in any of the preceding aspects, walls may be parallel to one another, may converge, or may diverge. Walls need not be arranged at identical angles; for example, a first wall may be angled at 5 degrees to a reference line, and a second wall may be angled at −10 degrees to that same reference line. As described elsewhere herein, walls need not be planar, flat, or even smooth—walls may include undulations or ridges. The high and low points of an undulation or ridge may be from 0.001 to 50 mm (and all intermediate values) from one another in some embodiments. As one example, the crest of a ridge in a wall may be 2 mm away from the trough or low point of that ridge.

It should also be understood that the pressure within an insulating space is suitably less than 760 Torr. Pressures of about $10^{-1}$, $10^{-2}$, $10^{-3}$, $10^{-4}$, $10^{-5}$, $10^{-6}$, and even about $10^{-7}$ Torr are all considered suitable.

What is claimed:
1. A vacuum insulated article, comprising:
an outer wall, an inner wall, and a middle wall, each of the outer wall, the inner wall, and the middle wall having a cylindrical shape that are concentric to each other,
a first insulating space formed between the outer wall and the middle wall;
a second insulating space formed between the middle wall and the inner wall, the first insulating space and the second insulating space being in fluid isolation from one another;
a first vent communicating with the first insulating space to provide an exit pathway for gas molecules from the first insulating space, the first vent being sealable for maintaining a first vacuum within the first insulating space following evacuation of gas molecules through the first vent,
the first vent being defined by a thickened end portion of the inner wall that extends outwardly from the inner wall toward the middle wall and is sealed to the middle wall;
a second vent communicating with the second insulating space to provide an exit pathway for gas molecules from the second insulating space, the second vent being sealable for maintaining a second vacuum within the second insulating space following evacuation of gas molecules through the second vent,
the second vent being defined by a thickened end portion of the middle wall that extends outwardly from the middle wall toward the outer wall and is sealed to the outer wall;
a first seal material sealing the first insulating space at the first vent; and
a second seal material sealing the second insulating space at the second vent.

2. The vacuum insulated article of claim 1, wherein at least one of the first insulating space and the second insulating space is at a pressure of from about $10^{-4}$ Torr to about $10^{-7}$ Torr.

3. The vacuum insulated article of claim 1, wherein the inner wall defines a surface that defines an open container.

4. A vacuum insulated article, comprising:
an outer wall, an inner wall, and a middle wall, the inner wall defining an open container that defines a major axis,
an area between the inner wall and the middle wall defining a first sealed insulating space, and an area between the middle wall and the outer wall defining a second sealed insulating space;
a first circular ring arranged between the inner wall and the middle wall, the first circular ring having a first beveled edge circularly arranged around the first circular ring facing at least one of the inner wall and the middle wall, the first circular ring defining a width measured along the major axis and a first vent formed at the first beveled edge communicating with the first sealed insulating space
a second circular ring arranged between the middle wall and the outer wall, the second circular ring having a second beveled edge circularly arranged around the second circular ring facing at least one of the middle wall and the outer wall, the second circular ring defining a width measured along the major axis that is different than the width of the first circular ring measured along the major axis, and a second vent formed at the second beveled edge communicating with the second sealed insulating space;
a first circular insulation seal sealing the first sealed insulating space at the first vent;
a second circular insulation seal sealing the second sealed insulating space at the second vent;
the first sealed insulating space and the second sealed insulating space being in fluid isolation from one another; and
the first sealed insulating space and second sealed insulating space being at less than ambient pressure.

5. The vacuum insulated article of claim 4, wherein both the first sealed insulating space and second sealed insulating space are at less than ambient pressure.

6. The vacuum insulated article of claim 4, wherein at least two of the outer wall, the inner wall, and the middle wall have a planar region.

7. The vacuum insulated article of claim 4, wherein at least one of the first sealed insulating space and the second sealed insulating space is at a pressure of from about $10^{-4}$ Torr to about $10^{-7}$ Torr.

8. A vacuum insulated article, comprising:
a first open container comprising an outer wall, an inner wall, and a middle wall, each of the outer wall, the inner wall, and the middle wall having a cylindrical shape,
an area between the inner wall and the middle wall forming a first insulating space, and
an area between the middle wall and the outer wall forming a second insulating space;
a first vent communicating with the first insulating space,
the first vent being defined by a thickened end portion of the inner wall that extends outwardly from the inner wall toward the middle wall and is sealed to the middle wall;
a second vent communicating with the second insulating space,
the second vent being defined by a thickened end portion of the middle wall that extends outwardly from the middle wall toward the outer wall and is sealed to the outer wall;
a first seal material sealing the first insulating space at the first vent; and
a second seal material sealing the second insulating space at the second vent,
at least one of the first and second insulating spaces being at a pressure of from about $10^{-4}$ Torr to about $10^{-7}$ Torr, and,
the first container defining an internal volume having an opening;
a second open container, the second container defining an opening,
the opening of the second container being opposite the opening of the first container.

9. The vacuum insulated article of claim 8, wherein the first and second containers are sealed to one another so as to interrupt fluid communication between the internal volume of the first container and the environment exterior to the internal volume of the first container.

10. The vacuum insulated article of claim 8, wherein at least one of the inner, middle, and outer walls has a cross-sectional dimension in the range of from about 0.01 mm to about 2 mm.

11. The vacuum insulated article of claim 10, wherein at least one of the inner, middle, and outer walls has a cross-sectional dimension in the range of from about 0.1 mm to about 1 mm.

12. The vacuum insulated article of claim 11, wherein at least one of the inner, middle, and outer walls has a cross-sectional dimension in the range of from about 0.5 mm to about 0.75 mm.

13. The vacuum insulated article of claim 8, wherein at least one of the first and second insulating spaces has a pressure of less than 760 Torr to about $10^{-7}$ Torr.

14. The vacuum insulated article of claim 8, wherein the second container comprises inner and outer walls.

15. The vacuum insulated article of claim 14, wherein the second container comprises an evacuated space disposed between the inner and outer walls of the second container.

16. The vacuum insulated article of claim 8, wherein the second container defines a cylindrical wall, the cylindrical wall facing the outer wall of the first container.

17. A vacuum insulated article, comprising:
   a first open container comprising an outer can, an inner can, and a middle can,
   each of the outer can, the inner can, and the middle can having a cylindrical shape,
   the first open container defining a major axis,
   the inner can comprising an inner bottom joined to a cylindrical inner wall by a rabbet joint; joint,
   the middle can comprising a middle bottom joined to a cylindrical middle wall by a rabbet joint; joint,
   the outer can comprising an outer bottom joined to a cylindrical outer wall by a rabbet joint; joint,
   an area between the cylindrical inner wall and the cylindrical middle wall forming a sealed first insulating space,
   an area between the cylindrical middle wall and the cylindrical outer wall forming a sealed second insulating space; space,
   a first vent communicating with the sealed first insulating space,
   a second vent communicating the sealed second insulating space,
   a first seal material sealing the sealed first insulating space at the first vent; vent, and
   a second seal material sealing the sealed second insulating space at the second vent,
   at least one of the sealed first and second insulating spaces being at a pressure of from about $10^{-4}$ Torr to about $10^{-7}$ Torr, and
   the first container defining an internal volume having an opening; and
   a second open container, the second container defining an opening,
   the opening of the second container being opposite the opening of the first container,
   the first container being at least partially disposed within the second container,
   the second container comprising an outer wall, an inner wall, and a middle wall, each of the outer wall, the inner wall, and the middle wall having a cylindrical shape,
   an area between the cylindrical inner wall of the second container and the cylindrical middle wall of the second container forming a first sealed insulating space of the second container,
   an area between the cylindrical middle wall of the second container and the cylindrical outer wall of the second container forming a second sealed insulating space of the second container;
   a first vent of the second container communicating with the first sealed insulating space of the second container, and
   a second vent of the second container communicating with the second sealed insulating space of the second container,
   at least one of the first and second insulating spaces of the second container being at a pressure of from about $10^{-4}$ Torr to about $10^{-7}$ Torr, and
   (a) the first vent of the second container being defined by a thickened end portion of the inner wall of the second container that extends outwardly from the inner wall of the second container toward the middle wall of the second container and is sealed to the middle wall of the second container; container,
   a second vent of the second container communicating with the second sealed insulating space of the second container,
   the second vent of the second container being defined by a thickened end portion of the middle wall of the second container that extends outwardly from the middle wall of the second container toward the outer wall and is sealed to the outer wall of the second container; container,
   a first seal material sealing the first insulating space at the first vent; vent, and
   a second seal material sealing the second insulating space at the second vent, vent; or
   (b) a first circular ring arranged between the inner wall of the second container and the middle wall of the second container, the first circular ring having a first beveled edge circularly arranged around the first circular ring facing at least one of the inner wall of the second container and the middle wall of the second container, the first circular ring defining a width measured along the major axis and a first vent of the second container formed at the first beveled edge communicating with the first sealed insulating space of the second container, a first circular insulation seal sealing the first sealed insulating space of the second container at the first vent of the second container and
   a second circular ring arranged between the middle wall of the second container and the outer wall of the second container, the second circular ring having a second beveled edge circularly arranged around the second circular ring facing at least one of the middle wall of the second container and the outer wall of the second container, the second circular ring defining a width measured along the major axis that is different than the width of the first circular ring measured along the major axis, and a second vent formed at the second beveled edge communicating with the second insulating space of the second container, a second circular insulation seal sealing the second insulating space at the second vent of the second container.

18. A method of forming a vacuum insulated article, comprising:
   with (a) a first tube having a first diameter defined by an outer wall, (b) a second tube having a second diameter defined by a middle wall, the second diameter being smaller than the first diameter, and (c) a third tube having a third diameter defined by an inner wall, the third diameter being smaller than the second diameter,
   positioning the third tube into the second tube to form a first annular insulating space between the third tube and the second tube, such that ends of the second tube and the third tube form a first circular vent between the end of the second tube and the end of the third tube;
   drawing a vacuum on the first annular insulating space by causing air to escape through the first circular vent;
   sealing the first circular vent to preserve the vacuum within the first annular insulating space;
   positioning the second tube into the first tube to form a second annular insulating space between the second tube and the first tube, such that ends of the first tube and the second tube are positioned adjacent to each other to form a second circular vent between the end of the first tube and the end of the second tube;
   drawing a vacuum on the second annular insulating space by causing air to escape through the second circular vent; and sealing the second circular vent to preserve the vacuum within the second annular insulating space, the first and second annular insulating spaces being in fluid isolation from one another, and at least one of the first and second annular insulating spaces is at a pressure of from about $10^{-4}$ Torr to about $10^{-7}$ Torr, wherein:

(A) the first circular vent is defined by a thickened end portion of the inner wall that extends outwardly from the inner wall toward the middle wall, and the second circular vent is defined by a thickened end portion of the middle wall that extends outwardly from the middle wall toward the outer wall; or (B) a first circular rim is arranged between the inner wall and the middle wall, the first circular rim having a first beveled edge circularly arranged around the first circular ring facing at least one of the inner wall and the middle wall, the first circular vent is formed at the first beveled edge communicating with the first annular insulating space; and a second circular ring is arranged between the middle wall and the outer wall, the second circular ring having a second beveled edge circularly arranged around the second circular rim facing at least one of the middle wall and the outer wall, and the second circular vent is formed at the second beveled edge communicating with the second annular insulating space.

* * * * *